United States Patent
Wocher et al.

(10) Patent No.: US 8,738,476 B2
(45) Date of Patent: May 27, 2014

(54) ARCHITECTURAL DESIGN FOR SELLING STANDARDIZED SERVICES APPLICATION SOFTWARE

(75) Inventors: Berthold Wocher, Gaiberg (DE);
Rainer Heun, Reilingen (DE); Nicola Nola, Hundling (FR); Andrea Sudbrack, Heidelberg (DE); Alexander Koegler, Walldorf (DE); Thomas Bach, Muehlhausen (DE); Thomas Breitling, Edingen-Neckarhausen (DE); Steffen Hartig, Nussloch (DE); Uma Kale, Bangalore (IN); Rudolf Gentner, Waghaeusel (DE); Thomas Nitschke, Nussloch (DE)

(73) Assignee: SAP AG, Walldorf (DE)

( * ) Notice: Subject to any disclaimer, the term of this patent is extended or adjusted under 35 U.S.C. 154(b) by 1184 days.

(21) Appl. No.: 12/327,701

(22) Filed: Dec. 3, 2008

(65) Prior Publication Data
US 2010/0138257 A1 Jun. 3, 2010

(51) Int. Cl.
*G07B 17/00* (2006.01)
*G07F 19/00* (2006.01)

(52) U.S. Cl.
USPC ............ 705/30; 705/7.23; 705/7.26; 705/32

(58) Field of Classification Search
None
See application file for complete search history.

(56) References Cited

U.S. PATENT DOCUMENTS

| | | | |
|---|---|---|---|
| 4,947,321 A | 8/1990 | Spence et al. | |
| 5,361,198 A | 11/1994 | Harmon et al. | |
| 5,550,734 A | 8/1996 | Tarter et al. | |
| 5,560,005 A | 9/1996 | Hoover et al. | |
| 5,566,097 A | 10/1996 | Myers et al. | |
| 5,586,312 A | 12/1996 | Johnson et al. | |
| 5,590,277 A | 12/1996 | Fuchs et al. | |
| 5,632,022 A | 5/1997 | Warren et al. | |
| 5,634,127 A | 5/1997 | Cloud et al. | |
| 5,680,619 A | 10/1997 | Gudmundson et al. | |
| 5,704,044 A | 12/1997 | Tarter et al. | |
| 5,710,917 A | 1/1998 | Musa et al. | |
| 5,768,119 A | 6/1998 | Havekost et al. | |
| 5,822,585 A | 10/1998 | Noble et al. | |

(Continued)

FOREIGN PATENT DOCUMENTS

| WO | 00/23874 | 4/2000 |
|---|---|---|
| WO | WO 2004/083984 | 9/2004 |
| WO | WO 2005/114381 | 12/2005 |

OTHER PUBLICATIONS

Bin et al.; "Component Model Optimization for Distributed Real-Time Embedded Software"; IEEE International Conference on Systems, Man and Cybernetics; Oct. 13, 2004; 6 pages.

(Continued)

*Primary Examiner* — Candice D Carter
(74) *Attorney, Agent, or Firm* — Fish & Richardson P.C.

(57) ABSTRACT

Methods, systems, and apparatus, including computer program products, for implementing a software architecture design for a software application implementing selling standardized services. The application is structured as multiple process components interacting with each other through service interfaces, and multiple service operations, each being implemented for a respective process component. The process components include a Customer Quote Processing process component; a Sales Order Processing process component; a Service Confirmation Processing process component; a Financial Accounting Master Data Management processing component; a Customer Invoice Processing process component; an Accounting process component; a Balance of Foreign Payment Management process component; a Due Item Processing process component; and a Payment Processing process component.

22 Claims, 20 Drawing Sheets

(56) References Cited

U.S. PATENT DOCUMENTS

| | | |
|---|---|---|
| 5,832,218 A | 11/1998 | Gibbs et al. |
| 5,848,291 A | 12/1998 | Milne et al. |
| 5,867,495 A | 2/1999 | Elliott et al. |
| 5,870,588 A | 2/1999 | Rompaey et al. |
| 5,881,230 A | 3/1999 | Christensen et al. |
| 5,893,106 A | 4/1999 | Brobst et al. |
| 5,898,872 A | 4/1999 | Richley |
| 5,918,219 A | 6/1999 | Isherwood |
| 5,987,247 A | 11/1999 | Lau |
| 5,991,536 A | 11/1999 | Brodsky et al. |
| H1830 H | 1/2000 | Petrimoulx et al. |
| 6,028,997 A | 2/2000 | Leymann et al. |
| 6,038,393 A | 3/2000 | Iyengar et al. |
| 6,049,838 A | 4/2000 | Miller et al. |
| 6,067,559 A | 5/2000 | Allard et al. |
| 6,070,197 A | 5/2000 | Cobb et al. |
| 6,112,024 A | 8/2000 | Almond et al. |
| 6,151,582 A | 11/2000 | Huang et al. |
| 6,167,563 A | 12/2000 | Fontana et al. |
| 6,167,564 A | 12/2000 | Fontana et al. |
| 6,177,932 B1 | 1/2001 | Galdes et al. |
| 6,182,133 B1 | 1/2001 | Horvitz |
| 6,192,390 B1 | 2/2001 | Berger et al. |
| 6,208,345 B1 | 3/2001 | Sheard et al. |
| 6,237,136 B1 | 5/2001 | Sadhiro |
| 6,272,672 B1 | 8/2001 | Conway |
| 6,311,170 B1 | 10/2001 | Embrey |
| 6,338,097 B1 | 1/2002 | Krenzke et al. |
| 6,424,991 B1 | 7/2002 | Gish |
| 6,434,740 B1 | 8/2002 | Monday et al. |
| 6,442,748 B1 | 8/2002 | Bowman-Amuah |
| 6,445,782 B1 | 9/2002 | Elfe et al. |
| 6,446,045 B1 | 9/2002 | Stone et al. |
| 6,446,092 B1 | 9/2002 | Sutter |
| 6,473,794 B1 | 10/2002 | Guheen et al. |
| 6,493,716 B1 | 12/2002 | Azagury et al. |
| 6,571,220 B1 | 5/2003 | Ogino et al. |
| 6,594,535 B1 | 7/2003 | Constanza |
| 6,601,233 B1 | 7/2003 | Underwood |
| 6,601,234 B1 | 7/2003 | Bowman-Amuah |
| 6,606,744 B1 | 8/2003 | Mikurak |
| 6,609,100 B2 | 8/2003 | Smith et al. |
| 6,640,238 B1 | 10/2003 | Bowman-Amuah |
| 6,671,673 B1 | 12/2003 | Baseman et al. |
| 6,678,882 B1 | 1/2004 | Hurley et al. |
| 6,687,734 B1 | 2/2004 | Sellink et al. |
| 6,691,151 B1 | 2/2004 | Cheyer et al. |
| 6,721,783 B1 | 4/2004 | Blossman et al. |
| 6,738,964 B1 | 5/2004 | Zink et al. |
| 6,747,679 B1 | 6/2004 | Finch et al. |
| 6,750,885 B1 | 6/2004 | Finch et al. |
| 6,757,837 B1 | 6/2004 | Platt et al. |
| 6,764,009 B2 | 7/2004 | Melick et al. |
| 6,772,216 B1 | 8/2004 | Ankireddipally et al. |
| 6,782,536 B2 | 8/2004 | Moore et al. |
| 6,789,252 B1 | 9/2004 | Burke et al. |
| 6,845,499 B2 | 1/2005 | Srivastava et al. |
| 6,847,854 B2 | 1/2005 | Discenzo |
| 6,859,931 B1 | 2/2005 | Cheyer et al. |
| 6,889,197 B2 | 5/2005 | Lidow |
| 6,889,375 B1 | 5/2005 | Chan et al. |
| 6,895,438 B1 | 5/2005 | Ulrich |
| 6,898,783 B1 | 5/2005 | Gupta et al. |
| 6,904,399 B2 | 6/2005 | Cooper et al. |
| 6,907,395 B1 | 6/2005 | Hunt et al. |
| 6,954,736 B2 | 10/2005 | Menninger et al. |
| 6,985,939 B2 | 1/2006 | Fletcher et al. |
| 6,990,466 B1 | 1/2006 | Hu |
| 7,003,474 B2 | 2/2006 | Lidow |
| 7,031,998 B2 | 4/2006 | Archbold |
| 7,043,448 B2 | 5/2006 | Campbell |
| 7,047,518 B2 | 5/2006 | Little et al. |
| 7,050,056 B2 | 5/2006 | Meyringer |
| 7,050,873 B1 | 5/2006 | Discenzo |
| 7,055,136 B2 | 5/2006 | Dzoba et al. |
| 7,058,587 B1 | 6/2006 | Horne |
| 7,069,536 B2 | 6/2006 | Yaung |
| 7,072,855 B1 | 7/2006 | Godlewski et al. |
| 7,076,766 B2 | 7/2006 | Wirts et al. |
| 7,100,195 B1 | 8/2006 | Underwood |
| 7,103,873 B2 | 9/2006 | Tanner et al. |
| 7,117,447 B2 | 10/2006 | Cobb et al. |
| 7,120,597 B1 | 10/2006 | Knudtzon et al. |
| 7,120,896 B2 | 10/2006 | Budhiraja et al. |
| 7,131,069 B1 | 10/2006 | Rush et al. |
| 7,149,887 B2 | 12/2006 | Morrison et al. |
| 7,155,403 B2 | 12/2006 | Cirulli et al. |
| 7,155,409 B1 | 12/2006 | Stroh |
| 7,181,694 B2 | 2/2007 | Reiss et al. |
| 7,184,964 B2 | 2/2007 | Wang |
| 7,194,431 B1 | 3/2007 | Land et al. |
| 7,197,740 B2 | 3/2007 | Beringer et al. |
| 7,200,569 B2 | 4/2007 | Gallagher et al. |
| 7,206,768 B1 | 4/2007 | deGroeve et al. |
| 7,213,232 B1 | 5/2007 | Knowles |
| 7,216,091 B1 | 5/2007 | Blandina et al. |
| 7,219,107 B2 | 5/2007 | Beringer |
| 7,222,786 B2 | 5/2007 | Renz et al. |
| 7,225,240 B1 | 5/2007 | Fox et al. |
| 7,249,044 B2 | 7/2007 | Kumar et al. |
| 7,257,254 B2 | 8/2007 | Tunney |
| 7,283,973 B1 | 10/2007 | Loghmani et al. |
| 7,293,254 B2 | 11/2007 | Bloesch et al. |
| 7,299,970 B1 | 11/2007 | Ching |
| 7,315,830 B1 | 1/2008 | Wirtz et al. |
| 7,322,024 B2 | 1/2008 | Carlson et al. |
| 7,324,966 B2 | 1/2008 | Scheer |
| 7,353,180 B1 | 4/2008 | Silverstone et al. |
| 7,356,492 B2 | 4/2008 | Hazi et al. |
| 7,367,011 B2 | 4/2008 | Ramsey et al. |
| 7,370,315 B1 | 5/2008 | Lovell et al. |
| 7,376,601 B1 | 5/2008 | Aldridge |
| 7,376,604 B1 | 5/2008 | Butcher |
| 7,376,632 B1 | 5/2008 | Sadek et al. |
| 7,383,201 B2 | 6/2008 | Matsuzaki et al. |
| 7,386,833 B2 | 6/2008 | Granny et al. |
| 7,406,716 B2 | 7/2008 | Kanamori et al. |
| 7,415,697 B1 | 8/2008 | Houlding |
| 7,418,409 B1 | 8/2008 | Goel |
| 7,418,424 B2 | 8/2008 | Martin et al. |
| 7,424,701 B2 | 9/2008 | Kendall et al. |
| 7,433,979 B2 | 10/2008 | Need |
| 7,448,022 B1 | 11/2008 | Ram et al. |
| 7,451,432 B2 | 11/2008 | Shukla et al. |
| 7,460,654 B1 | 12/2008 | Jenkins et al. |
| 7,461,030 B2 | 12/2008 | Hibler et al. |
| 7,469,233 B2 | 12/2008 | Shooks et al. |
| 7,516,088 B2 | 4/2009 | Johnson et al. |
| 7,523,054 B2 | 4/2009 | Tyson-Quah |
| 7,529,699 B2 | 5/2009 | Fuse et al. |
| 7,536,325 B2 | 5/2009 | Randell et al. |
| 7,536,354 B2 | 5/2009 | deGroeve et al. |
| 7,546,520 B2 | 6/2009 | Davidson et al. |
| 7,546,575 B1 | 6/2009 | Dillman et al. |
| 7,565,640 B2 | 7/2009 | Shukla et al. |
| 7,574,694 B2 | 8/2009 | Mangan et al. |
| 7,624,371 B2 | 11/2009 | Kulkarni et al. |
| 7,631,291 B2 | 12/2009 | Shukla et al. |
| 7,640,195 B2 | 12/2009 | Von Zimmermann et al. |
| 7,640,291 B2 | 12/2009 | Maturana et al. |
| 7,644,390 B2 | 1/2010 | Khodabandehloo et al. |
| 7,657,406 B2 | 2/2010 | Tolone et al. |
| 7,657,445 B1 | 2/2010 | Goux |
| 7,665,083 B2 | 2/2010 | Demant et al. |
| 7,668,761 B2 | 2/2010 | Jenkins et al. |
| 7,672,888 B2 | 3/2010 | Allin et al. |
| 7,681,176 B2 | 3/2010 | Wills et al. |
| 7,693,586 B2 | 4/2010 | Dumas et al. |
| 7,703,073 B2 | 4/2010 | Illowsky et al. |
| 7,739,160 B1 | 6/2010 | Ryan et al. |
| 7,742,985 B1 | 6/2010 | Digrigoli et al. |
| 7,747,980 B2 | 6/2010 | Illowsky et al. |
| 7,765,156 B2 | 7/2010 | Staniar et al. |
| 7,765,521 B2 | 7/2010 | Bryant |

(56) References Cited

U.S. PATENT DOCUMENTS

| | | |
|---|---|---|
| 7,788,145 B2 | 8/2010 | Wadawadigi et al. |
| 7,788,319 B2 | 8/2010 | Schmidt |
| 7,793,256 B2 | 9/2010 | Charisius et al. |
| 7,793,258 B2 | 9/2010 | Sundararajan et al. |
| 7,797,698 B2 | 9/2010 | Diament et al. |
| 7,814,142 B2 | 10/2010 | Mamou et al. |
| 7,822,682 B2 | 10/2010 | Arnold et al. |
| 7,835,971 B2 | 11/2010 | Stockton et al. |
| 7,886,041 B2 | 2/2011 | Outhred et al. |
| 7,895,568 B1 | 2/2011 | Goodwin et al. |
| 7,904,350 B2 | 3/2011 | Ayala et al. |
| 7,912,755 B2 | 3/2011 | Perry et al. |
| 7,917,889 B2 | 3/2011 | Devarakonda et al. |
| 7,925,985 B2 | 4/2011 | Moore |
| 8,001,519 B2 | 8/2011 | Conallen et al. |
| 8,010,938 B2 | 8/2011 | Elaasar |
| 8,051,332 B2 | 11/2011 | Zakonov et al. |
| 8,091,065 B2 | 1/2012 | Mir et al. |
| 8,112,738 B2 | 2/2012 | Pohl et al. |
| 2001/0052108 A1 | 12/2001 | Bowman-Amuah |
| 2002/0026394 A1 | 2/2002 | Savage et al. |
| 2002/0042756 A1 | 4/2002 | Kumar et al. |
| 2002/0049622 A1 | 4/2002 | Lettich et al. |
| 2002/0073114 A1 | 6/2002 | Nicastro et al. |
| 2002/0078046 A1 | 6/2002 | Uluakar et al. |
| 2002/0082892 A1 | 6/2002 | Raffel et al. |
| 2002/0103660 A1 | 8/2002 | Cramon et al. |
| 2002/0104071 A1 | 8/2002 | Charisius et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |
| 2002/0184111 A1 | 12/2002 | Swanson |
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0058277 A1 | 3/2003 | Bowman-Amuah |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0054564 A1 | 3/2004 | Fonseca et al. |
| 2004/0093268 A1 | 5/2004 | Ramchandani et al. |
| 2004/0093381 A1 | 5/2004 | Hodges et al. |
| 2004/0111304 A1 | 6/2004 | Meka et al. |
| 2004/0111639 A1 | 6/2004 | Schwartz et al. |
| 2004/0128180 A1 | 7/2004 | Abel et al. |
| 2004/0133481 A1 | 7/2004 | Schwarze et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1 | 9/2004 | Grounds |
| 2004/0181538 A1 | 9/2004 | Lo et al. |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0156500 A1 | 7/2005 | Birecki et al. |
| 2005/0160104 A1 | 7/2005 | Meera et al. |
| 2005/0165784 A1 | 7/2005 | Gomez et al. |
| 2005/0177435 A1* | 8/2005 | Lidow ............................ 705/22 |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0216507 A1 | 9/2005 | Wright |
| 2005/0222896 A1 | 10/2005 | Rhyne et al. |
| 2005/0234787 A1 | 10/2005 | Wallmeier et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0257197 A1 | 11/2005 | Herter et al. |
| 2005/0262192 A1 | 11/2005 | Mamou et al. |
| 2005/0262453 A1 | 11/2005 | Massasso |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0149574 A1 | 7/2006 | Bradley et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0022410 A1 | 1/2007 | Ban et al. |
| 2007/0050308 A1 | 3/2007 | Latvala et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0143164 A1 | 6/2007 | Kaila et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156428 A1 | 7/2007 | Brecht-Tillinger et al. |
| 2007/0156430 A1 | 7/2007 | Kaetker et al. |
| 2007/0156474 A1 | 7/2007 | Scherberger et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1* | 7/2007 | Berger et al. ...................... 705/8 |
| 2007/0156493 A1 | 7/2007 | Tebbe et al. |
| 2007/0156499 A1 | 7/2007 | Berger et al. |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0156731 A1 | 7/2007 | Ben-Zeev |

(56) References Cited

U.S. PATENT DOCUMENTS

| | | | |
|---|---|---|---|
| 2007/0162893 | A1 | 7/2007 | Moosmann et al. |
| 2007/0164849 | A1 | 7/2007 | Haeberle et al. |
| 2007/0168303 | A1 | 7/2007 | Moosmann et al. |
| 2007/0174068 | A1 | 7/2007 | Alfandary et al. |
| 2007/0174145 | A1 | 7/2007 | Hetzer et al. |
| 2007/0174811 | A1 | 7/2007 | Kaetker et al. |
| 2007/0186209 | A1 | 8/2007 | Kaetker et al. |
| 2007/0197877 | A1 | 8/2007 | Decorte et al. |
| 2007/0198391 | A1 | 8/2007 | Dreyer et al. |
| 2007/0214065 | A1 | 9/2007 | Kahlon et al. |
| 2007/0220046 | A1 | 9/2007 | Moosmann et al. |
| 2007/0220143 | A1 | 9/2007 | Lund et al. |
| 2007/0233539 | A1 | 10/2007 | Suenderhauf et al. |
| 2007/0233541 | A1 | 10/2007 | Schorr et al. |
| 2007/0233545 | A1 | 10/2007 | Cala et al. |
| 2007/0233574 | A1 | 10/2007 | Koegler et al. |
| 2007/0233575 | A1 | 10/2007 | Berger et al. |
| 2007/0233581 | A1 | 10/2007 | Peter |
| 2007/0233598 | A1* | 10/2007 | Der Emde et al. ............... 705/40 |
| 2007/0234282 | A1 | 10/2007 | Prigge et al. |
| 2007/0239508 | A1 | 10/2007 | Fazal et al. |
| 2007/0239569 | A1 | 10/2007 | Lucas et al. |
| 2007/0265860 | A1 | 11/2007 | Herrmann et al. |
| 2007/0265862 | A1 | 11/2007 | Freund et al. |
| 2008/0004929 | A9 | 1/2008 | Raffel et al. |
| 2008/0017722 | A1 | 1/2008 | Snyder et al. |
| 2008/0027831 | A1 | 1/2008 | Gerhardt |
| 2008/0065437 | A1 | 3/2008 | Dybvig |
| 2008/0120129 | A1 | 5/2008 | Seubert et al. |
| 2008/0147507 | A1 | 6/2008 | Langhammer |
| 2008/0162382 | A1 | 7/2008 | Clayton et al. |
| 2008/0208707 | A1 | 8/2008 | Erbey et al. |
| 2008/0263152 | A1 | 10/2008 | Daniels et al. |
| 2008/0300959 | A1 | 12/2008 | Sinha et al. |
| 2009/0037287 | A1 | 2/2009 | Baitalmal et al. |
| 2009/0037492 | A1 | 2/2009 | Baitalmal et al. |
| 2009/0063112 | A1 | 3/2009 | Hader et al. |
| 2009/0171716 | A1 | 7/2009 | Suenderhauf et al. |
| 2009/0171818 | A1 | 7/2009 | Penning et al. |
| 2009/0172699 | A1 | 7/2009 | Jungkind et al. |
| 2009/0189743 | A1 | 7/2009 | Abraham et al. |
| 2009/0192858 | A1 | 7/2009 | Johnson |
| 2009/0222760 | A1 | 9/2009 | Halverson et al. |
| 2010/0070324 | A1 | 3/2010 | Bock et al. |
| 2010/0070331 | A1 | 3/2010 | Koegler et al. |
| 2010/0070336 | A1 | 3/2010 | Koegler et al. |
| 2010/0070391 | A1 | 3/2010 | Storr et al. |
| 2010/0070395 | A1 | 3/2010 | Elkeles et al. |
| 2010/0070555 | A1 | 3/2010 | Duparc et al. |
| 2010/0100464 | A1 | 4/2010 | Ellis et al. |
| 2010/0138269 | A1 | 6/2010 | Cirpus et al. |
| 2011/0252395 | A1 | 10/2011 | Charisius et al. |

OTHER PUBLICATIONS

Cascallar, Eduardo et al.; "Assessment in the Evaluation of Self-Regulation as a Process"; Educational Psychology Review; vol. 18, No. 3; Sep. 2006; pp. 297-306.

Cohen; "Optimizer: IBM's Multi-Echelon Inventory System for Managing Service Logistics Interfaces"; vol. 20, No. 1; 1990; pp. 65-82.

Cohen et al.; "Saturn's Supply-Chain Innovation: High Value in After Sales Service"; Sloan Management Review; vol. 41, No. 4; 2000; pp. 93-101.

Cool, David W.; "Activity Fund Accounting"; School Business Affairs; vol. 49, No. 6; Jun. 1983; pp. 50-52.

Cox et al.; "A Formal Model for Component Based Software"; IEEE; Aug. 7, 2002; 8 pages.

Ferscha et al.; "A Light-Weight Component Model for Peer-to-Peer Applications"; IEEE; Mar. 23, 2004.

Finin et al.; "KQML as an Agent Communication Language"; retrieved on Jul. 26, 2011; pp. 456-463. <http://portal.acm.org/citation.cfm?id=191322>.

Flissi et al.; "A Component-based Software Infrastructure for Ubiquitous Computing"; IEEE; Jul. 4, 2005.

Gould; "Integrating the Manufacturing Enterprise"; Automative Design & Production; 119, 1; ABI/INFORM Global; Jan. 2007; 3 pages.

Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.

Kalakota et al.; "Readings in Electronic Commerce"; Addison-Wesley Longman, Inc.; 1995; ISBN: 0-201-88060-1.

Orsburn; "Spares Management Handbook"; McGrawHill; 1991; ISBN: 0-8306-7626-0.

Papazoglou et al; "Service-Oriented Computing Research Road Map"; http://infolab.uvt.nl/pub/papazogloump-2006-96.pdf; Mar. 1, 2006; 29 pages.

SAP AG; "SAP NetWeaver Visual Composer: User Guide (SAP NetWeaver Visual Composer release 6.0)"; Document version 1.1; 2004; pp. 1-208.

SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMWFAQ_50070686_en.pdf.

Strelich, Thomas P. et al.; "Simulation-Based Transformation with the Service Integration/Interoperation Infrastructure"; Technology Review Journal; Fall/Winter 2005; pp. 99-115.

Office Action issued in U.S. Appl. No. 11/396,236 on Oct. 28, 2010; 19 pages.

Notice of Allowance issued in U.S. Appl. No. 12/233,554 on Sep. 17, 2010; 10 pages.

Notice of Allowance issued in U.S. Appl. No. 12/233,554 on Feb. 22, 2011; 7 pages.

Notice of Allowance issued in U.S. Appl. No. 12/233,554 on Jun. 27, 2011; 7 pages.

Office Action issued in U.S. Appl. No. 12/233,550 on Jan. 12, 2011; 29 pages.

Notice of Allowance issued in U.S. Appl. No. 12/233,550 on May 11, 2011; 20 pages.

Office Action issued in U.S. Appl. No. 12/333,146 on Sep. 6, 2011; 21 pages.

Office Action issued in U.S. Appl. No. 11/323,634 on Apr. 29, 2011; 8 pages.

Office Action issued in U.S. Appl. No. 11/322,973 on Dec. 7, 2010; 13 pages.

Office Action issued in U.S. Appl. No. 11/322,973 on May 27, 2011; 15 pages.

Notice of Allowance issued in U.S. Appl. No. 11/396,327 on Nov. 30, 2010; 28 pages.

Office Action issued in U.S. Appl. No. 11/404,147 on Nov. 24, 2010; 27 pages.

Office Action issued in U.S. Appl. No. 11/404,147 on Aug. 4, 2011; 26 pages.

Notice of Allowance issued in U.S. Appl. No. 12/233,462 on Feb. 2, 2011; 11 pages.

Notice of Allowance issued in U.S. Appl. No. 12/233,462 on May 18, 2011; 6 pages.

Notice of Allowance issued in U.S. Appl. No. 12/233,462 on Sep. 2, 2011; 7 pages.

Office Action issued in U.S. Appl. No. 12/233,457 on May 26, 2011; 19 pages.

Office Action issued in U.S. Appl. No. 11/967,483 on Aug. 20, 2010; 10 pages.

Office Action issued in U.S. Appl. No. 11/967,483 on Mar. 4, 2011; 6 pages.

Office Action issued in U.S. Appl. No. 12/327,232 on May 26, 2011; 20 pages.

Office Action issued in U.S. Appl. No. 12/327,590 on Jun. 23, 2011; 16 pages.

Notice of Allowance issued in U.S. Appl. No. 12/333,085; Sep. 13, 2010; 8 pages.

Office Action issued in U.S. Appl. No. 12/233,087 on Aug. 18, 2011; 42 pages.

(56) References Cited

OTHER PUBLICATIONS

Office Action issued in U.S. Appl. No. 11/396,312 on Sep. 10, 2010; 23 pages.
Office Action issued in U.S. Appl. No. 11/322,611 on Sep. 16, 2010; 21 pages.
Notice of Allowance issued in U.S. Appl. No. 12/233,534 on Oct. 20, 2010; 15 pages.
Notice of Allowance issued in U.S. Appl. No. 12/233,534 on Jan. 31, 2011; 15 pages.
Notice of Allowance issued in U.S. Appl. No. 12/233,534 on May 16, 2011; 12 pages.
Notice of Allowance issued in U.S. Appl. No. 11/322,382 on Sep. 20, 2010; 6 pages.
Notice of Allowance issued in U.S. Appl. No. 11/322,382 on Jan. 6, 2011; 7 pages.
Notice of Allowance issued in U.S. Appl. No. 11/322,382 on Jul. 25, 2011; 5 pages.
Notice of Allowance issued in U.S. Appl. No. 11/322,610 on Sep. 23, 2010; 6 pages.
Notice of Allowance issued in U.S. Appl. No. 11/322,610 on Dec. 22, 2010; 6 pages.
Notice of Allowance issued in U.S. Appl. No. 11/322,610 on Mar. 31, 2011; 6 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowanced issued in U.S. Appl. No. 11/322,398 on May 27, 2011; 21 pages.
Notice of Allowance issued in U.S. Appl. No. 11/396,259 on Oct. 15, 2010; 6 pages.
Notice of Allowance issued in U.S. Appl. No. 11/396,259 on Jan. 20, 2011; 6 pages.
Notice of Allowance issued in U.S. Appl. No. 11/396,259 on Aug. 5, 2011; 7 pages.
Notice of Allowance issued in U.S. Appl. No. 11/396,288; Dec. 28, 2010; 4 pages.
Notice of Allowance issued in U.S. Appl. No. 11/396,288; Sep. 24, 2010; 4 pages.
Office Action issued in U.S. Appl. No. 11/396,250 on Oct. 18, 2010; 15 pages.
Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Notice of Allowance issued in U.S. Appl. No. 11/396,258 on Jul. 28, 2010; 9 pages.
Notice of Allowance issued in U.S. Appl. No. 11/396,258 on Nov. 16, 2010; 8 pages.
Notice of Allowance issued in U.S. Appl. No. 11/396,258 on Jun. 28, 2011; 9 pages.
Notice of Allowance issued in U.S. Appl. No. 11/322,851 on Sep. 2, 2011; 8 pages.
Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Office Action issued in U.S. Appl. No. 11/323,040 on Nov. 5, 2010; 33 pages.
Office Action issued in U.S. Appl. No. 11/323,040 on Jul. 26, 2011; 34 pages.
Notice of Allowance issued in U.S. Appl. No. 11/397,026 on Nov. 15, 2010; 7 pages.
Notice of Allowance issued in U.S. Appl. No. 11/397,026 on Mar. 3, 2011; 6 pages.
Notice of Allowance issued in U.S. Appl. No. 11/397,026 on Jul. 20, 2011; 8 pages.
Office Action issued in U.S. Appl. No. 12/233,417 on Apr. 7, 2011; 32 pages.
Notice of Allowance issued in U.S. Appl. No. 12/233,417 on Sep. 14, 2011; 11 pages.
Notice of Allowance issued in U.S. Appl. No. 11/968,054 on Sep. 7, 2010; 11 pages.
Notice of Allowance issued in U.S. Appl. No. 11/968,054 on Aug. 2; 5 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,557 on Sep. 16, 2010; 16 pages.
Office Action issued in U.S. Appl. No. 12/233,557 on Mar. 4, 2011; 19 pages.
Office Action issued in U.S. Appl. No. 12/233,489 on May 13, 2011; 15 pages.
Office Action issued in U.S. Appl. No. 11/967,393 o n Apr. 15, 2011; 12 pages.
Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Oct. 6, 2010; 6 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.
Aleksy, M. et al.; "Interoperability of Java-Based Applications and SAP' s Business Framework State of the Art and Desirable Developments"; Proceedings of the International Symposium on Edinburgh, UK; Sep. 1999; IEEE Computer Soc.; pp. 190-200.
Anon,; "Sequenst Corp Bell Atlantic: Bell Atlantic Selects Sequent for Video-on-Demand Program; Sequent Moves to Sieze Opportunity in New Market"; Business Wire; Dec. 6, 1994.
Anon.; "State of the Art Reports™ 13,000 MAS 90® for Windows® Shipments in First Nine Months of Availability"; PR Newswire; Apr. 28, 1997.
Arch-int, S. et al.; "Development of Industrial Information Systems on the Web Using Busienss Components"; Computers in Industry; vol. 60; 2003; pp. 231-250.
Astudillo, H.; "How Conceptual System Architecture Leads to Business Process"; ACM; 2000; pp. 35-36.
Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.
Avery, S.; "Buyer's Guide to Software for Purchasing 2000.(Directory)"; Purchasing, vol. 129, No. 1; p. 179; Jul. 13, 2000.
Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.
Cowan, D.D. et al.; "Application Integration: Constructing Composite Applications from Interactive Components"; Software Practice and Experience; vol. 23, No. 3; Mar. 1993; pp. 255-275.
Deimel, A.; "The SAP R/3 Business Framework"; Software—Concepts & Tools; vol. 19, No. 1; 1998; pp. 29-36.
Fellner, K.J., et al.; "Classification Framework for Business Components"; System Sciences; Proceedings of the 33rd Annual Hawaii International Conference; Jan. 2000; pp. 3239-3248.
Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.

(56) References Cited

OTHER PUBLICATIONS

Gauthier, P. and OSS-J Architecture Board; "OSS through Java (TM) J2EE Design Guidelines"; [online]; Oct. 31, 2001; http://www.ossj.org/downloads/design_guidelines.shtml.
Gessford, J.E.; "Object-Oriented System Design"; Emerging Information Technologies for Competitive Advantage and Economic Development; Proceedings of the 1992 Information Resources Management Association International Conference; 1992; pp. 110-118.
He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.
"Hudson's Bay Company Realizes Fast ROI with the Oracle E-Business Suite"; PR Newswire; New York; Jan. 15, 2002; p. 1.
Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.
Kythe, D.K.; "The Promise of Distributed Business Components"; Bell Labs Technical Journal; vol. 75, No. 2; Mar./Apr. 1999; pp. 20-28.
Linthicum, D.S.; "Chapter 9: RPCs, Messaging, and B2B Application Integration"; B2B Application Integration: E-Business Enable Your Enterprise; 2001; pp. 167-181.
Nori A.K. et al.; "Composite Applications: Process Based Application Development"; Lecture Notes in Computer Science; vol. 2444; Aug. 2003; pp. 48-53.
Pilhofer, F.; "Writing and Using CORBA Components"; Apr. 2002; http://www.fpx.de/MicoCCM/download/mico-ccm.pdf; 17 pages.
Ravichandran, T.; "Special Issue on Component-Based Software Development"; The Data Base for Advances in Information Systems; 2003; pp. 45-46.
SAP AG; "Designing Cross Solutions"; SAP XAPPS, [online]; Sep. 2003; pp. 1-2; http://www.sap.com/belux/platform/netweaver/pdf/BWP_CAF.pdf.
Schmid, H.A.; "Business Entity Components and Buisness Process Components"; Joop; vol. 12, No. 6; Oct. 1999; pp. 6-10, 12-15.
Sharifi, M. et al.; "CORBA Components Collocation Optimization Enhanced with Local ORB-Like Services Support"; on the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.
Singh, I. et al.; "Designing Enterprise Applications with the J2EE Platform, Second Edition"; Jun. 15, 2002.
Stojanovic, Z. et al.; "Modeling and Design of Service-Oriented Architecture"; Systems, Man and Cybernetics; 2004 IEEE International Conference on the Hague, The Netherlands; Oct. 2004; IEEE, vol. 5; pp. 4147-4152.
Thomas, A.; "Enterprise JavaBeans Server Component Model for Java"; [online]; Dec. 1997; http://www.cs.indiana.edu/classes/b649-gann/ejb-white-paper.pdf.
Vergil Technology Ltd.; "Vergil Composite Application Builder Suite"; Product Datasheet [online]; 2003; pp. 1-5; http://www.webservicesmall.com.docs/VCAB_datasheet.pdf.
Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.
International Search Report and Written Opinion of the International Searching Authority issued in International Application No. PCT/EP2006/012625; Apr. 3, 2007; 8 pages.
International Preliminary Report on Patentability issued in International Application No. PCT/EP2006/012625; Jul. 1, 2008; 7 pages.
International Search Report and Written Opinion of the International Searching Authority issued in International Application No. PCT/EP2006/012614; Mar. 16, 2007; 7 pages.
International Preliminary Report on Patentability issued in International Application No. PCT/US2006/012614; Jul. 1, 2008; 6 pages.
International Search Report and Written Opinion of the International Searching Authority issued in International Application No. PCT/EP2006/012618; Apr. 3, 2007; 8 pages.
International Preliminary Report on Patentability issued in International Application No. PCT/EP2006/012618; Jul. 1, 2008; 7 pages.
International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.
International Search Report and Written Opinion of the International Searching Authority issued in International Application No. PCT/EP2006/012624; Mar. 30, 2007; 9 pages.
International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
International Preliminary Report on Patentability issued in International Application No. PCT/EP2007/002835; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/323,041; Apr. 30, 2009; 26 pages.
Office Action issued in U.S. Appl. No. 11/322,612; May 11, 2009; 24 pages.
Office Action issued in U.S. Appl. No. 11/322,772; Mar. 25, 2009; 12 pages.
Office Action issued in U.S. Appl. No. 11/323,590; Jan. 9, 2009; 23 pages
Office Action issued in U.S. Appl. No. 11/396,288; Jan. 2, 2009; 18 pages.
Office Action issued in U.S. Appl. No. 11/396,288; Apr. 15, 2008; 26 pages.
Office Action issued in U.S. Appl. No. 11/397,029; Jul. 21, 2009; 28 pages.
Office Action issued in U.S. Appl. No. 11/323,040; Jul. 24, 2009; 35 pages.
Office Action issued in U.S. Appl. No. 11/323,590; Jul. 10, 2009; 32 pages.
Office Action issued in U.S. Appl. No. 11/322,816; Jul. 23, 2006; 41 pages.
Office Action issued in U.S. Appl. No. 11/322,851; Sep. 2, 2009; 32 pages.
Office Action issued in U.S. Appl. No. 11/323,590; Dec. 30, 2009; 31 pages.

(56) References Cited

OTHER PUBLICATIONS

Office Action issued in U.S. Appl. No. 11/322,482; Jan. 7, 2010; 19 pages.
Office Action issued in U.S. Appl. No. 11/322,772; Dec. 9, 2009; 14 pages.
Office Action issued in U.S. Appl. No. 11/323,039; Sep. 4, 2009; 36 pages.
Office Action issued in U.S. Appl. No. 11/323,634; Sep. 10, 2009; 15 pages.
Office Action issued in U.S. Appl. No. 11/322,383; Nov. 12, 2009; 29 pages.
Office Action issued in U.S. Appl. No. 11/396,258; Nov. 25, 2009; 9 pages.
Office Action issued in U.S. Appl. No. 12/333,085; Jun. 25, 2009; 9 pages.
Office Action issued in U.S. Appl. No. 11/396,288; Aug. 19, 2009; 20 pages.
"American Software Announces ASP Pricing Model for It's a-Applications Expense Business Solution"; PR Newswire; Mar. 6, 2000; 2 pages.
Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable Systems: Problem Model Construction"; ACM SIGSOFT; vol. 33, No. 3; 2008; pp. 1-13.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Duc et al.; "Uniform Object Modeling Methodology and Reuse of Real Time System Using UML"; EMSOFT '05; Sep. 19-22, 2005; pp. 44-47.
Gomaa et al.; "Model Based Software Design and Adaption"; International Workshop on Software Engineering for Adaptive and Self-Managing Systems (SEAMS '07); IEEE; 2007; 10 pages.
Huang, S. et al.; "Computer-Assisted Supply Chain Configuration Based on Supply Chain Operations Reference (SCOR) Model"; Computers & Industrial Engineering 48; 2005; pp. 377-394.
Intuit Canada Ltd.; "Startup Guide—QuickBooks Basic for Windows, QuickBooks Pro for Windows, QuickBooks Premier for Windows"; 2002; 230 pages.
Lambert et al.; "Supply Chain Metrics"; International Journal of Logistics Management; vol. 12, No. 1; 2001; pp. 1-19.
Lockamy III, et al.; "Linking SCOR Planning Practices to Supply Chain Performance"; International Journal of Operationgs & Production Management; vol. 24, No. 12; pp. 1192-1218.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
"Oracle Expands E-Commerce Offerings with the Acquisition of E-Travel, Inc."; PR Newswire; Mar. 9, 1999; 3 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy: The Executive's Journal; Summer 2003; pp. 12-20.
Stephens, S.; "Supply Chain Council & Supply Chain Operations Reference (SCOR) Model Overview"; <http://www.supply-chain.org>; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Notice of Allowance issued in U.S. Appl. No. 11/322,610 on Jun. 14, 2010; 6 pages.
Office Action issued in U.S. Appl. No. 11/322,772; Jul. 12, 2010; 18 pages.
Office Action issued in U.S. Appl. No. 11/322,398 on Apr. 2, 2010; 39 pages.
Notice of Allowance issued in U.S. Appl. No. 11/322,398 on Jul. 23, 2010; 38 pages.
Office Action issued in U.S. Appl. No. 11/322,383; May 12, 2010; 23 pages.
Office Action issued in U.S. Appl. No. 11/322,382 on Mar. 29, 2010; 28 pages.
Office Action issued in U.S. Appl. No. 11/323,041 on Mar. 19, 2010; 26 pages.
Advisory Action issued in U.S. Appl. No. 11/323,041 on Jun. 7, 2010; 3 pages.
Notice of Allowance issued in U.S. Appl. No. 11/396,259 on Mar. 29, 2010; 19 pages.
Notice of Allowance issued in U.S. Appl. No. 11/396,259 on Jul. 6, 2010; 6 pages.
Notice of Allowance issued in U.S. Appl. No. 11/396,288; May 20, 2010; 15 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Office Action issued in U.S. Appl. No. 11/396,236 on Mar. 31, 2010; 20 pages.
Office Action issued in U.S. Appl. No. 11/323,039; Apr. 14, 2010; 15 pages.
Office Action issued in U.S. Appl. No. 11/322,851; May 12, 2010; 15 pages.
Office Action issued in U.S. Appl. No. 11/322,845; Jul. 15, 2010; 16 pages.
Office Action issued in U.S. Appl. No. 11/323,040; Apr. 29, 2010; 17 pages.
Office Action issued in U.S. Appl. No. 11/322,612; Apr. 1, 2010; 23 pages.
Advisory Action issued in U.S. Appl. No. 11/322,612; Jun. 24, 2010; 3 pages.
Notice of Allowance issued in U.S. Appl. No. 11/397,026 on Mar. 29, 2010; 17 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 12/233,554 on May 14, 2010; 11 pages.
Notice of Allowance issued in U.S. Appl. No. 12/233,534 on Jun. 24, 2010; 15 pages.

(56) References Cited

OTHER PUBLICATIONS

Notice of Allowance issued in U.S. Appl. No. 12/327,354 on Jun. 25, 2010; 16 pages.
Notice of Allowance issued in U.S. Appl. No. 11/967,865 on Mar. 31, 2010; 16 pages.
Notice of Allowance issued in U.S. Appl. No. 11/322,482; Jul. 13, 2010; 5 pages.
Office Action issued in U.S. Appl. No. 11/323,590; Jun. 21, 2010; 25 pages.
Office Action issued in U.S. Appl. No. 11/323,634; Apr. 2, 2010; 9 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 12/333,085; Mar. 23, 2010; 5 pages.
Anonymous; "Mastering Management"; Motor Age, vol. 25, No. 10; Oct. 2006; pp. 1-3.
Gerin et al.; "Flexible and Executable Hardware/Software Interface Modeling for Multiprocessor SOC Design Using SystemC"; IEEE; 2007; pp. 390-395.
Hahn; "A Domain Specific Modeling Language for Multi-Agent Systems"; ACM AAMAS; 2008; pp. 233-240.
Hu; "A Co-Design Modeling Approach for Computer Network Systems"; IEEE; 2007; pp. 685-693.
Kremic, Tibor; "Outsourcing Decision Support: A Survey of Benefits, Risks, and Decision Factor"; Supply Chain Management; V. 11; 2006; pp. 467-482.
Sarjoughian et al.; "CoSMoS: A Visual Environment for Component Based Modeling, Experimental Design and Simulation"; ACM; 2009; pp. 1-9.
Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.
Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.
Notice of Allowance issued in U.S. Appl. No. 11/396,327 on Sep. 28, 2011; 31 pages.
Office Action issued in U.S. Appl. No. 12/233,479 on Oct. 27, 2011; 24 pages.
Office Action issued in U.S. Appl. No. 12/332,965 on Oct. 11, 2011; 6 pages.
Notice of Allowance in U.S. Appl. No. 12/233,462 on Dec. 12, 2011; 6 pages.
Office Action issued in U.S. Appl. No. 12/233,289 on Oct. 27, 2011; 15 pages.
Notice of Allowance issued in U.S. Appl. No. 12/233,457 on Nov. 3, 2011; 12 pages.
Notice of Allowance issued in U.S. Appl. No. 12/327,232 on Nov. 2, 2011; 16 pages.
Notice of Allowance issued in U.S. Appl. No. 12/327,590 on Dec. 28, 2011; 10 pages.
Notice of Allowance issued in U.S. Appl. No. 12/233,534 on Dec. 28, 2011; 7 pages.
Notice of Allowanced issued in U.S. Appl. No. 11/322,398 on Oct. 18, 2011; 7 pages.
Office Action issued in U.S. Appl. No. 11/322,383 on May 12, 2010; 23 pages.
Office Action issued in U.S. Appl. No. 11/322,383 on Nov. 12, 2009; 23 pages.
Office Action issued in U.S. Appl. No. 11/396,288 on Oct. 17, 2011; 38 pages.
Notice of Allowance issued in U.S. Appl. No. 11/396,250 on Dec. 7, 2011; 6 pages.
Examiner's Answer to Appeal Brief issued in U.S. Appl. No. 11/396,236 on Nov. 10, 2011; 19 pages.
Office Action issued in U.S. Appl. No. 11/396,252 on Nov. 10, 2011; 18 pages.
Notice of Allowance issued in U.S. Appl. No. 11/322,845; Nov. 13, 2011; 9 pages.
Office Action issued in U.S. Appl. No. 11/397,026; Jul. 21, 2009; 28 pages.
Notice of Allowance issued in U.S. Appl. No. 11/397,026 on Nov. 4, 2011; 8 pages.
Notice of Allowance issued in U.S. Appl. No. 12/233,520 on Nov. 10, 2011; 22 pages.
Notice of Allowance issued in U.S. Appl. No. 11/968,054 on Aug. 2, 2011; 5 pages.
Office Action issued in U.S. Appl. No. 12/233,458 on Oct. 12, 2011; 19 pages.
Office Action issued in U.S. Appl. No. 11/967,489 on Sep. 28, 2011; 7 pages.
Notice of Allowance issued in U.S. Appl. No. 11/967,393 on Nov. 9, 2011; 9 pages.
"IDe Partners with Journyx to Offer Customers Best-in-Class Time Management Solution"; PR Newswire; Mar. 8, 2005; Business Dateline.
Meseroll, Robert; "Data Mining Navy Flight"; IEEE Autotestcom 2007; Sep. 2007; pp. 476-481.
"Trakware Systems Inc. Expands Management Team: Leading To-Order Software Provider Adds Experienced Global VP Sales and Marketing to its World-Class Team"; Canada NewsWire; Apr. 9, 2008.
Trappey, Amy; "Design and Analysis of a Rule Based Knowledge"; International Journal of Manufacturing Tech; Dec. 2007; 35,3-4:385-93.
Notice of Allowance issued in U.S. Appl. No. 12/233,550 on Jan. 9, 2012; 11 pages.
Office Action issued in U.S. Appl. No. 12/333,146 on Feb. 2, 2012; 21 pages.
Notice of Allowance issued in U.S. Appl. No. 11/323,634 on Jan. 25, 2012; 5 pages.
Office Action issued in U.S. Appl. No. 11/322,816; Jul. 23, 2009; 41 pages.
Office Action issued in U.S. Appl. No. 12/233,479 on May 7, 2012; 26 pages.
Notice of Allowance issued in U.S. Appl. No. 12/332,965 on Jun. 11, 2012; 21 pages.
Notice of Allowance in U.S. Appl. No. 12/233,462 on Apr. 5, 2012; 7 pages.
Notice of Allowance issued in U.S. Appl. No. 12/233,289 on Feb. 15, 2012; 11 pages.
Notice of Allowance issued in U.S. Appl. No. 12/233,087 on Mar. 30, 2012; 30 pages.
Notice of Allowance issued in U.S. Appl. No. 11/396,259 on Mar. 15, 2012; 7 pages.
Notice of Allowance issued in U.S. Appl. No. 11/396,258 on Feb. 3, 2012; 12 pages.
Notice of Allowance issued in U.S. Appl. No. 11/322,851 on Mar. 1, 2012; 9 pages.
Notice of Allowance issued in U.S. Appl. No. 11/397,026 on Feb. 23, 2012; 8 pages.
Office Action issued in U.S. Appl. No. 11/967,489 on Feb. 6, 2012; 9 pages.
Office Action issued in U.S. Appl. No. 11/967,387 on Apr. 12, 2012; 13 pages.
Office Action issued in U.S. Appl. No. 12/327,737 on Mar. 26, 2012; 14 pages.
Notice of Allowance issued in U.S. Appl. No. 12/233,075 on Mar. 22, 2012; 25 pages.

* cited by examiner

ARCHITECTURAL DESIGN FOR SELLING STANDARDIZED SERVICES APPLICATION SOFTWARE

BACKGROUND

The subject matter of this patent application relates to computer software architecture, and, more particularly, to the architecture of application software for selling standardized services.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for a software application implementing selling standardized services.

In its various aspects, the software architecture design can be implemented as methods, systems, and apparatus, including computer program products, for implementing a software architecture design for a software application implementing selling standardized services. The software application is structured as multiple process components interacting with each other through service interfaces, and multiple service operations, each being implemented for a respective process component. The process components include a Customer Quote Processing process component; a Sales Order Processing process component; a Service Confirmation Processing process component; a Financial Accounting Master Data Management processing component; a Customer Invoice Processing process component; an Accounting process component; a Balance of Foreign Payment Management process component; a Due Item Processing process component; an Expense and Reimbursement Management process component; and a Payment Processing process component.

In its various aspects, the software architecture design can further be implemented as methods, systems, and apparatus, including computer program products, implementing a software architecture design for a software application that is adapted to interact with external software systems through the service operations described in reference to external process components, or a subcombination of them.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

DETAILED DESCRIPTION

Figure 1:
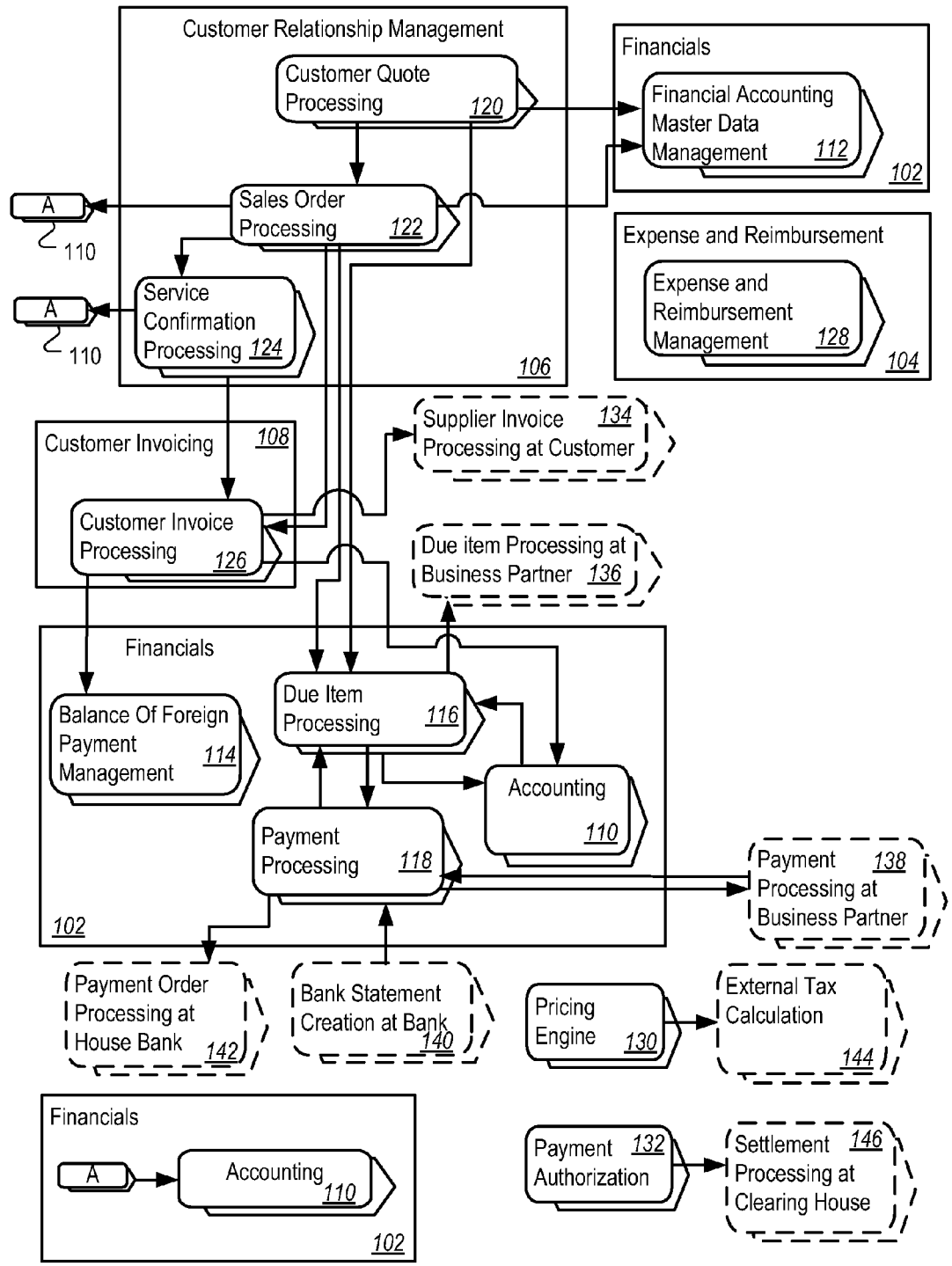
FIG. 1 is a block diagram of a software architectural design for a selling standardized services software application.

FIG. 1 shows the software architectural design for a selling standardized services software application. The selling standardized services application is software that implements a process of selling of standardized service products to customers. Selling standardized services includes processing customer quotes as well as planning and executing sales orders with service provisions documented in service confirmations.

In general, standardized services provided to a customer can be invoiced, and the customer's payments can be monitored. Accounting information can be continually updated throughout the integration scenario.

As shown in FIG. 1, the sell standardized services design includes a Financials deployment unit 102, an Expense and Reimbursement deployment unit 104, a Customer Relationship Management deployment unit 106, and a Customer Invoicing deployment unit 108.

The Financials deployment unit 102 includes an Accounting process component 110, a Financial Accounting Master Data Management process component 112, a Balance of Foreign Payment Management process component 114, a Due Item Processing process component 116, and a Payment Processing process component 118. The Accounting process component 110 handles the representation of relevant business transactions for valuation and profitability analysis. The Financial Accounting Master Data Management process component 112 handles the management of financial accounting master data that is used both for accounting and costing purposes.

The Balance of Foreign Payment Management process component 114 handles the collection, processing, and reporting of receivables and payables according to foreign trade regulations that are used by the financial authority of a country, such as the central bank.

The Due Item Processing process component 116 handles the collection, management, and monitoring of trade receivables or payables and corresponding sales tax or withholding tax.

The Payment Processing process component 118 handles the processing and management of all payments. The Payment Processing process component is also responsible for the associated communication with financial institutions such as banks, and provides the primary input for liquidity management.

The Customer Relationship Management deployment unit 106 includes a Customer Quote Processing process component 120, a Sales Order Processing process component 122, and a Service Confirmation Processing process component 124. The Customer Quote Processing process component 120 handles the processing of quotes to customers offering the delivery of goods according to specific terms. The Sales Order Processing process component 122 handles the processing of customers' requests to a seller for the delivery of goods, on a specific date, for a specific quantity, and for a specific price. The Service Confirmation Processing process component 124 handles the reporting back of actual times and quantities for services provided, and spare parts consumed related to the execution of a service order.

The Customer Invoicing deployment unit 108 includes a Customer Invoicing Processing process component 126 which invoices customers for the delivery of goods or the provision of services.

The Expense and Reimbursement deployment unit 104 includes an Expense and Reimbursement Management process component 128. The Expense and Reimbursement Management process component 128 handles the management and monitoring of expenses incurred by employees, and the reimbursement of such expenses to employees. It includes the process of verifying the validity of expenses submitted by internal or external employees, settling the expenses in conformance with legal requirements and company policy, reimbursing the expenses to the employees, transferring the expenses to financial accounting, and transferring taxable amounts to payroll for internal employees.

The foundation layer, described below, includes a Pricing Engine processing component 130 and a Payment Authorization process component 132. The Pricing Engine process component 130 processes price and tax calculation. The Payment Authorization process component 132 provides a reusable service that is used to process an authorization request for a payment made using a payment card at a clearing house. For example, the Payment Authorization process component 132 can authorize a payment for goods or services purchased from an online store using a credit card.

A number of external process components, described below, will be used to describe the architectural design. These include a Supplier Invoice Processing at Customer process component 134, a Due Item Processing at Business Partner process component 136, a Payment Processing at Business Partner process component 138, a Bank Statement Creation at Bank process component 140, a Payment Order Processing at House Bank process component 142, an External Tax Calculation process component 144, and a Settlement Processing at Clearing House process component 146.

The Supplier Invoice Processing at Customer process component 134 receives messages from the Customer Invoice Processing process component 126. The Due Item Processing at Business Partner process component 136 receives messages from the Due Item Processing process component 116. The Payment Processing at Business Partner process component 138 sends and receives messages from the Payment Processing process component 118. The Bank Statement Creation at Bank process component 140 sends messages to the Payment Processing process component 118. The Payment Order Processing at House Bank process component 142 receives messages from the Payment Processing process component 118. The External Tax Calculation process component 144 receives messages from the Pricing Engine process component 130. The Settlement Processing at Clearing House process component 146 receives messages from the Payment Authorization process component 132.

Figure 2:
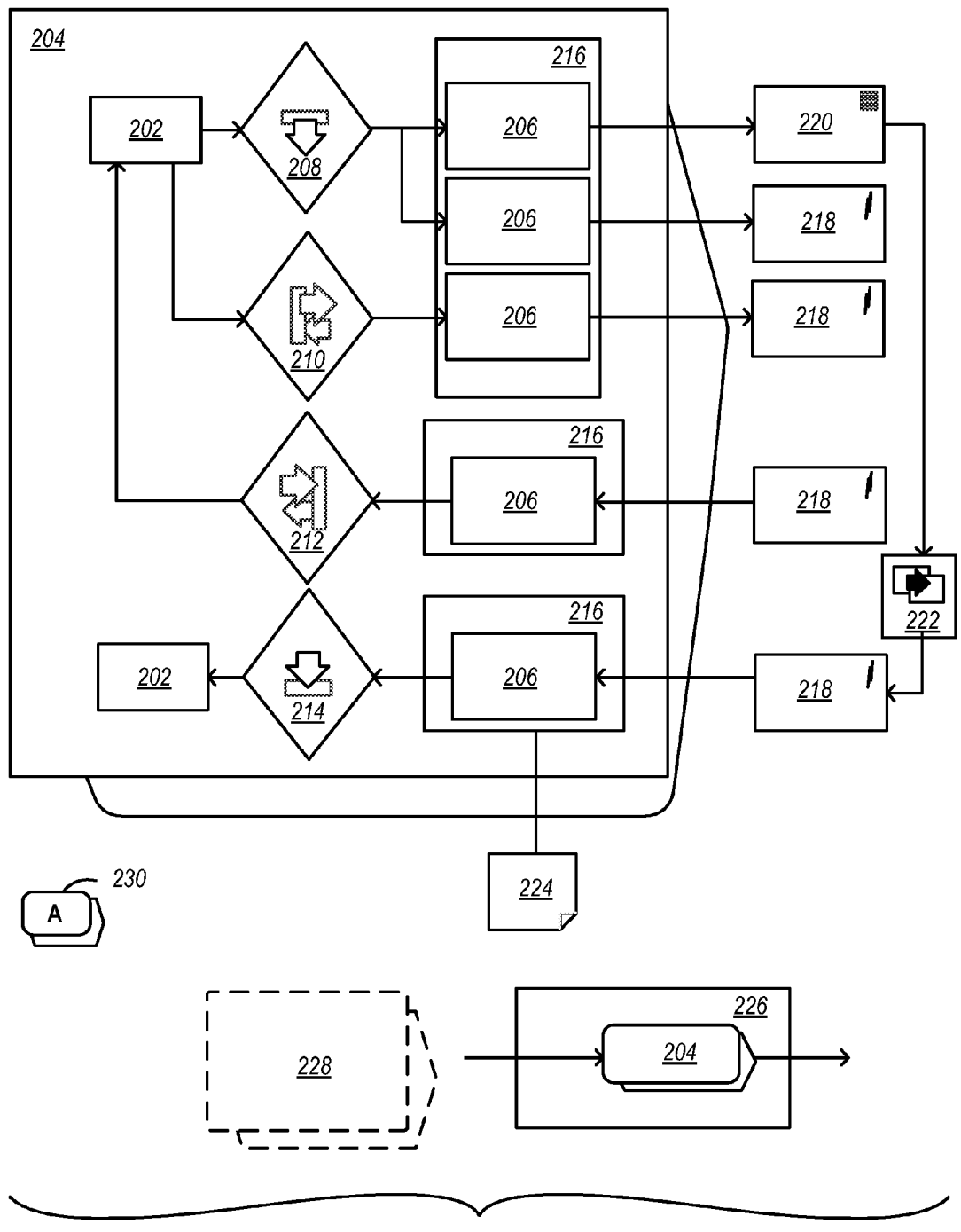
FIG. 2 illustrates the elements of the architecture as they are drawn in the figures.

FIG. 2 illustrates the elements of the architecture as they are drawn in the figures of this patent application. The elements of the architecture include the business object 202, the process component 204, the operation 206, the outbound process agent 208, the synchronous outbound process agent 210, the synchronous inbound process agent 212, the inbound process agent 214, the service interface or interface 216, the message 218, the form message 220, the mapping entity 222, the communication channel template 224, and the deployment unit 226.

Not explicitly represented in the figures is a foundation layer that contains all fundamental entities that are used in multiple deployment units 226. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

A process component of an external system is drawn as a dashed-line process component 228. Such a process component 228 represents the external system in describing interactions with the external system; however, the process component 228 need not represent more of the external system than is needed to produce and receive messages as required by the process component that interacts with the external system.

The connector icon 230 is used to simplify the drawing of interactions between process components 204. Interactions between process component pairs 204 involving their respective business objects 202, process agents (at 208, 210, 212, and 214), operations 206, interfaces 216, and messages (at 218 and 22) are described as process component interactions, which determine the interactions of a pair of process components across a deployment unit boundary, i.e., from one deployment unit 226 to another deployment unit 226. Interactions between process components 204 are indicated in FIG. 1 by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components 204, but interfaces 216, process agents (at 208, 210, 212, and 214), and business objects 202 that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component 204 is described as being contained in a deployment unit 226. It should be understood, however, that such operational inclusion can be realized in a variety of ways and is not limited to a physical inclusion of the entirety of one element in another.

The architectural elements include the business object 202. A business object 202 is a representation of a type of a uniquely identifiable business entity (an object instance) described by a structural model. Processes operate on business objects. This example business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component 204, is an object that encapsulates transactional data (i.e., data that is valid for a point in time). The term business object will be used generically to refer to a business process object and a master data object, unless the context requires otherwise. Properly implemented, business objects 202 are implemented free of redundancies.

The architectural elements also include the process component 204. A process component 204 is a software package that realizes a business process and generally exposes its functionality as services. The functionality includes the ability to perform all or parts of particular kinds of business transactions. A process component 204 contains one or more semantically related business objects 202. Any business object belongs to no more than one process component. Process components can be categorized as a standard process component, a process component at a business partner, a third party process component, or a user centric process component. The standard process component (named simply process component) is a software package that realizes a business process and exposes its functionality as services. The process component at a business partner is a placeholder for a process component (or other technology that performs the essential functions of the process component) used at a business partner. The third party process component is a process component (or other technology that performs the essential functions of the process component) provided by a third party. The user centric process component is a process component containing user interface parts.

Process components 204 are modular and context-independent. That they are context-independent means that a process component 204 is not specific to any specific application and is reusable. The process component 204 is often the smallest (most granular) element of reuse in the architecture.

The architectural elements also include the operation 206. An operation 206 belongs to exactly one process component 204. A process component 204 generally is able to perform multiple operations 206. Operations 206 can be synchronous or asynchronous, corresponding to synchronous or asynchronous process agents (e.g. at 208, 210, 212, and 214), which will be described below. Operation 206 may be the smallest, separately-callable function, described by a set of data types used as input, output, and fault parameters serving as a signature.

The architectural elements also include the service interface 216, referred to simply as the interface. An interface 216 is a named group of operations 206. Interface 216 typically specifies inbound service interface functionality or outbound service interface functionality. Each operation 206 belongs to exactly one interface 216. An interface 216 belongs to exactly one process component 204. A process component 204 might contain multiple interfaces 216. In some implementations, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations 206 directed to the same other process component 204 are in one interface 216.

The architectural elements also include the message 218. Operations 206 transmit and receive messages 218. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component. In some implementations, the message is a form based message 220 that can be translated into a recognized format for an external process component 228. The form message type 220 is a message type used for documents structured in forms. The form message type 220 can be used for printing, faxing, emailing, or other events using documents structured in forms. In some implementations, the form message type 220 provides an extended signature relative to the normal message type. For example, the form message type 220 can include text information in addition to identification information to improve human reading.

The architectural elements also include the process agent (e.g. at 208, 210, 212, and 214). Process agents do business processing that involves the sending or receiving of messages 218. Each operation 206 will generally have at least one associated process agent. The process agent can be associated with one or more operations 206. Process agents (at 208, 210, 212, and 214) can be either inbound or outbound, and either synchronous or asynchronous.

Asynchronous outbound process agents 208 are called after a business object 202 changes, e.g., after a create, update, or delete of a business object instance. Synchronous outbound process agents 210 are generally triggered directly by a business object 202.

An outbound process agent (208 and 210) will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents (212 and 214) are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents (210 and 212) are used when a process component requires a more or less immediate response from another process component, and is waiting for that response to continue its work.

Operations and process components are described in this specification in terms of process agents. However, in alternative implementations, process components and operations can be implemented without use of agents by using other conventional techniques to perform the functions described in this specification.

The architectural elements also include the communication channel template. The communication channel template is a modeling entity that represents a set of technical settings used for communication. The technical settings can include details for inbound or outbound processing of a message. The details can be defined in the communication channel template. In particular, the communication channel template defines an adapter type, a transport protocol, and a message protocol. In some implementations, various other parameters may be defined based on a selected adapter type. For example, the communication channel template can define a security level, conversion parameters, default exchange infrastructure parameters, processing parameters, download URI parameters, and specific message properties.

The communication channel template 224 can interact with internal or external process components (at 204 and 228). To interact with an internal process component, the communication channel template is received and uploaded to be used with an operation and interface pair. To interact with an external process component, the communication channel template is received and uploaded to be used with an external entity, such as an external bank, business partner, or supplier.

The architectural elements also include the deployment unit 226. A deployment unit 226 includes one or more process components 204 that are deployed together on a single computer system platform. Conversely, separate deployment units can be deployed on separate physical computing systems. For this reason, a boundary of a deployment unit 226 defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components 204 of one instance of one deployment unit 226.

The process components 204 of one deployment unit 226 interact with those of another deployment unit 226 using messages 218 passed through one or more data communication networks or other suitable communication channels. Thus, a deployment unit 226 deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units 226 is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components 204 that interact with other process components 204 or external systems only through messages 218, e.g., as sent and received by operations 206, can also be replaced as long as the replacement supports the operations 206 of the original 204.

In contrast to a deployment unit 226, the foundation layer does not define a limit for application-defined transactions. Deployment units 226 communicate directly with entities in the foundation layer, which communication is typically not message based. The foundation layer is active in every system instance on which the application is deployed. Business objects 202 in the foundation layer will generally be master data objects. In addition, the foundation layer will include some business process objects that are used by multiple deployment units 226. Master data objects and business process objects that should be specific to a deployment unit 226 are assigned to their respective deployment unit 226.

Interactions between Process Components "Sales Order Processing" and "Financial Accounting Master Data Management"

Figure 3:
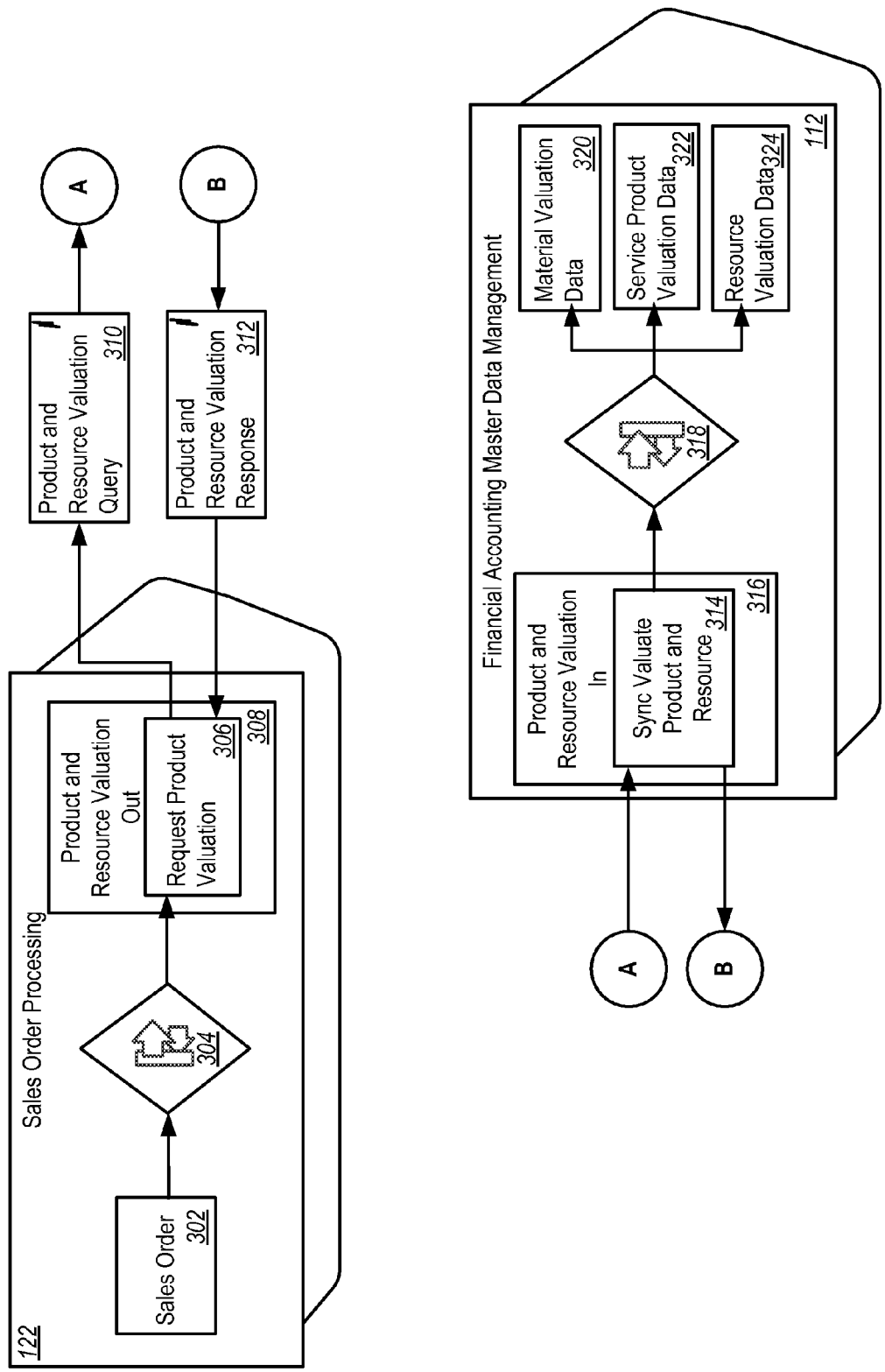
FIG. 3 is a block diagram showing interactions between a Sales Order Processing process component and a Financial Accounting Master Data Management process component.

FIG. 3 is a block diagram showing interactions between a Sales Order Processing process component 122 and a Financial Accounting Master Data Management process component 112 in the architectural design of FIG. 1. The interaction starts when a sales order is created or changed. The Sales Order Processing process component 122 requests the product valuation price from the Financial Accounting Master Data Management process component 112. The Financial Accounting Master Data Management process component 112 provides the requested information to the requestor.

As shown in FIG. 3, the Sales Order Processing process component 122 includes a Sales Order business object 302. The Sales Order business object 302 represents an agreement between a seller and a customer concerning the sale and delivery of goods, as well as any services that are associated with these processes, on a specific date, for a specific quantity, and for a specific price.

The Sales Order business object 302 uses a Synchronous Request Product Valuation from Sales Order to Financial Accounting Master Data outbound process agent 304 to invoke a Request Product Valuation operation 306. The Request Product Valuation operation 306 is included in a Product and Resource Valuation Out interface 308. The operation 306 requests a product valuation. The Request Product Valuation operation 306 sends a Product and Resource Valuation Query message 310 to the Financial Accounting Master Data Management process component 140.

A Synchronous Valuate Product and Resource operation 314 receives the Product and Resource Valuation Query message 310. The operation 314 is included in a Product and Resource Valuation In interface 316, and can synchronize access to product pricing information. The Synchronous Valuate Product and Resource operation 314 valuates one or more products or resources with internal valuation prices or internal cost rates. For example, the product or resource can be valuated as an individual object or in the context of a business transaction. For example, the result of the valuation for a product or resources can be a price and an amount (optional) provided that a quantity was entered for the valuation. The operation 314 uses a Synchronous Valuate Product and Resource synchronous inbound process agent 318 to update either a Material Valuation Data business object 320, a Service Product Valuation Data business object 322, or a Resource Valuation Data business object 324. The Material Valuation Data business object 320 represents data that references a material or material group for valuating business transactions, for cost estimates, and for value-based management of material inventories. For example, business object 320 contains internal valuation prices for a material or material group. The Service Product Valuation Data business object 322 represents data that references a service product or service product group for the valuation of business transactions and for cost estimates and cost accounting. For example, business object 322 contains the internal cost rates for a service product or service product group. The Resource Valuation Data business object 324 represents data that references a resource or resource group for the valuation of business transactions and for cost estimates and cost accounting. For example, business object 324 contains the internal cost rates for a resource or resource group.

The Financial Accounting Master Data Management process component 140 sends a Product and Resource Valuation Response message 312 to the Sales Order Processing process component 122.

Interactions between Process Components "Payment Processing" and "Due Item Processing"

Figure 4:
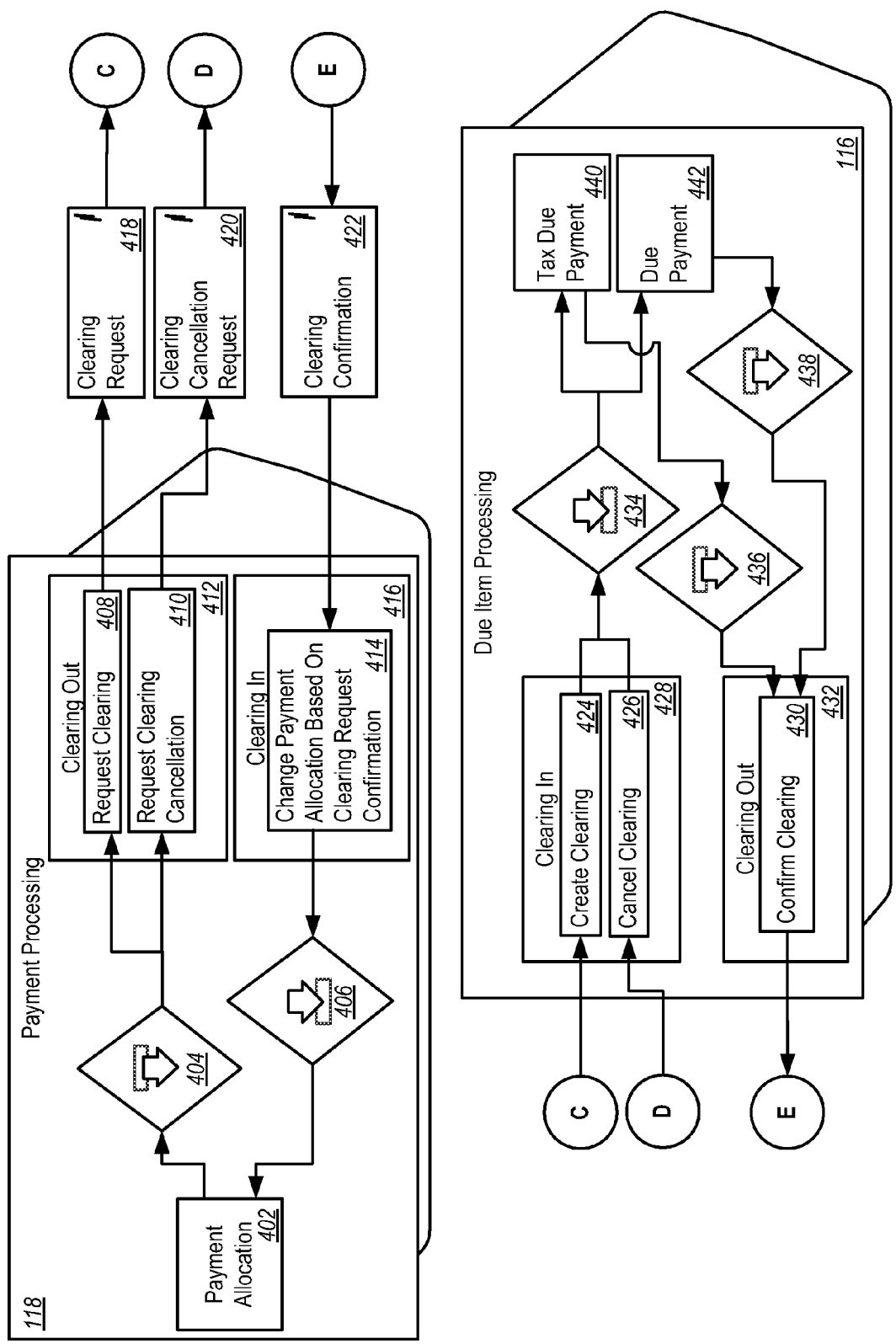
FIG. 4 is a block diagram showing interactions between a Payment Processing process component and a Due Item Processing process component.

FIG. 4 is a block diagram showing interactions between a Payment Processing process component 118 and a Due Item Processing process component 116 in the architectural design of FIG. 1. The interaction starts when a payment allocation is created or cancelled with the Due Item Processing process component 116, which is responsible for the clearing of a payment. The Payment Processing process component 118 requests the clearing or the cancellation of a clearing from Due Item Processing process component 116. Due Item Processing process component 116 informs the Payment Processing process component 118 of the clearing result.

The Payment Processing process component 118 includes a Payment Allocation business object 402. The Payment Allocation business object 402 represents an assignment of a payment item to a payment reasons from which the payment item originated. The Payment Allocation business object 402 uses a Request Clearing Maintenance from Payment Allocation to Due Item Processing outbound process agent 404 to invoke a Request Clearing operation 408 or a Request Clearing Cancellation operation 410. The operations 408 and 410 are included in a Clearing Out interface 412. The Request Clearing operation 408 requests the clearing of payments within Due Item Processing process component 116. The Request Clearing Cancellation operation 410 cancels a previously sent clearing request from Due Item Processing process component 116 by reference. If the Request Clearing operation 408 is invoked, a Clearing Request message 418 is sent. If the Request Clearing Cancellation operation 410 is invoked, a Clearing Cancellation Request message 420 is sent.

A Create Clearing operation 424 receives the Clearing Request message 418. The Create Clearing operation 424 creates a clearing for business partner-initiated payments. The operation 424 uses a Maintain Clearing inbound process agent 434 to update either a Tax Due Payment business object 440 or a Due Payment business object 442. The Tax Due Payment business object 440 represents a payment request or payment confirmation with regard to tax payables and receivables. The Due Payment business object 442 represents a payment request or payment confirmation with regard to trade receivables and payables.

A Cancel Clearing operation 426 receives the Clearing Cancellation Request message 420. The Cancel Clearing operation 426 cancels a previously sent clearing request by reference. The operation 426 uses the Maintain Clearing inbound process agent 434 to update either the Tax Due Payment business object 440 or the Due Payment business object 442. The operations 424 and 426 are included in a Clearing In interface 428.

The Tax Due Payment business object 440 uses a Confirm Clearing from Tax Due Payment to Payment Processing outbound process agent 436 to invoke a Confirm Clearing operation 430. The Due Payment business object 442 uses a Confirm Clearing from Due Payment to Payment Processing outbound process agent 438 to invoke the Confirm Clearing operation 430. The operation 430 sends a confirmation to the Payment Processing process component 118 for a clearing request. The operation 430 is included in a Clearing Out interface 432. The Confirm Clearing operation 430 sends a Clearing Confirmation message 422.

The Clearing Confirmation message 422 is received by a Change Payment Allocation based on Clearing Request Confirmation operation 414. The operation 414 confirms the execution or rejection of a sent clearing request. The operation 414 is included in a Clearing In interface 416. The Change Payment Allocation based on Clearing Request Confirmation operation 414 uses a Change Payment Allocation based on Clearing Request Confirmation inbound process agent 406 to update the Payment Allocation business object 402.

Interactions between Process Components "Customer Invoice Processing" and "Balance of Foreign Payment Management"

Figure 5:
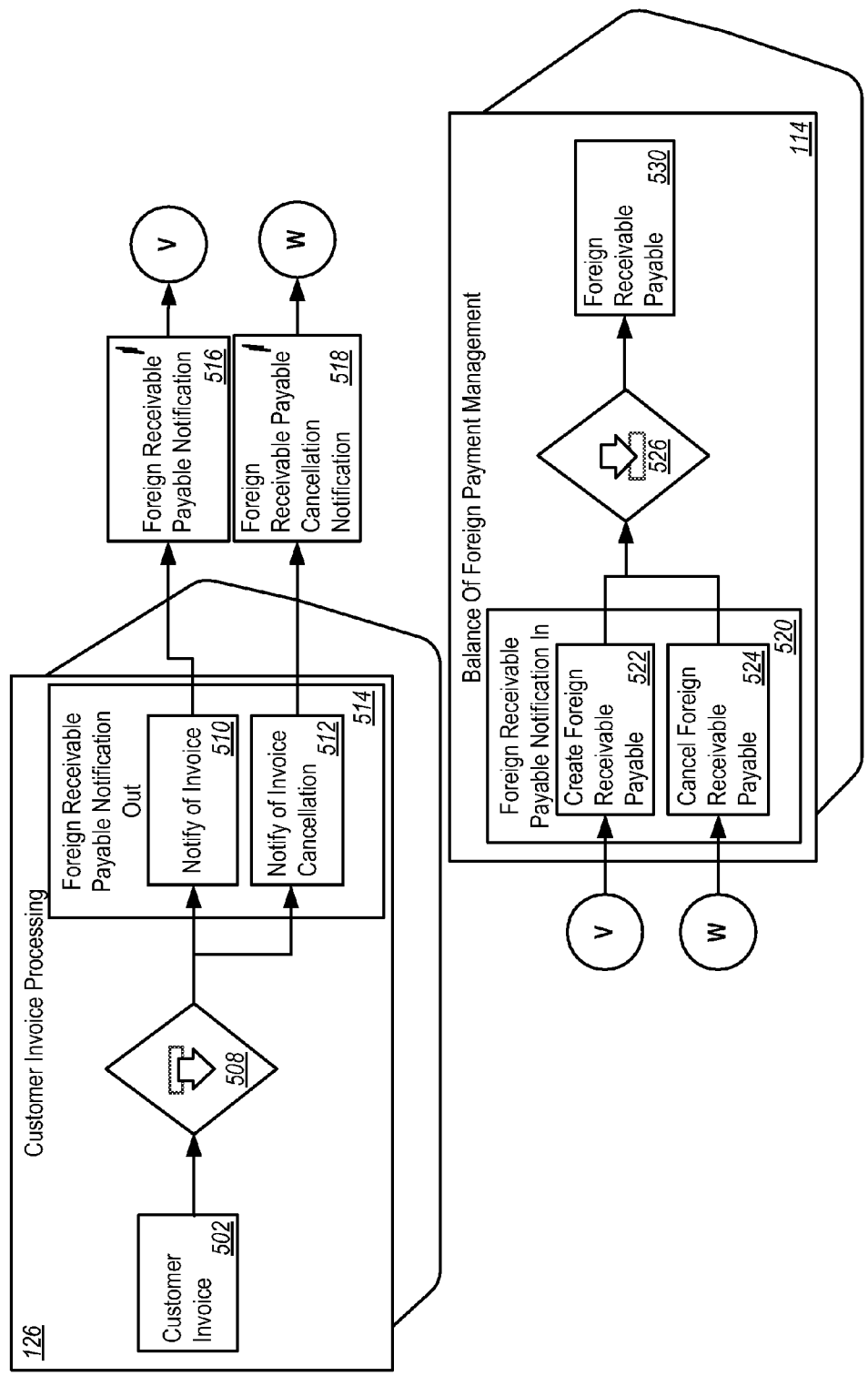
FIG. 5 is a block diagram showing interactions between the Customer Invoice Processing process component and a Balance of Foreign Payment Management process component.

FIG. 5 is a block diagram showing interactions between the Customer Invoice Processing process component 126 and a Balance of Foreign Payment Management process component 114 in the architectural design of FIG. 1. The interaction starts when a customer invoice or receivable is created or cancelled related to a non-resident buyer. The Customer Invoice Processing process component 126 notifies the Balance of Foreign Payments Management process component 114 about the creation or cancellation of a receivable related to a non-resident buyer.

As shown in FIG. 5, the Customer Invoice Processing process component 126 includes a Customer Invoice business object 502. The Customer Invoice business object 502 represents a binding statement of amounts receivable resulting, example, from deliveries to a customer, services performed for a customer, adjustments to the receivables, or credit memos to a customer.

The Customer Invoice business object 502 uses a Notify of Customer Invoice to Balance of Foreign Payments Management outbound process agent 508 to invoke a Notify of Invoice operation 510. The operation 510 informs the Balance Of Foreign Payment Management process component 114 about an invoice in order to track a receivable from or a payable to a non-resident business partner. Alternatively, the Customer Invoice business object 502 uses the outbound process agent 508 to invoke a Notify of Invoice Cancellation operation 512. The operation 512 informs the Balance Of Foreign Payment Management process component 114 about the cancellation of an invoice in order to also cancel information about a receivable from or a payable to a non-resident business partner. Operations 510 and 512 are included in a Foreign Receivable Payable Notification Out interface 514. The Notify of Invoice operation 510 sends a Foreign Receivable Payable Notification message 516 to the Balance Of Foreign Payment Management process component 114. The Notify of Invoice Cancellation operation 512 sends a Foreign Receivable Payable Cancellation Notification message 518 to the Balance Of Foreign Payment Management process component 114.

The messages 516 and 518 are received by a Create Foreign Receivable Payable operation 522 and a Cancel Foreign Receivable Payable operation 524, respectively. The Create Foreign Receivable Payable operation 522 creates a foreign receivable or payable from foreign trade. The Cancel Foreign Receivable Payable operation 524 cancels a foreign receivable or payable. The Create Foreign Receivable Payable operation 522 and the Cancel Foreign Receivable Payable operation 524 are both included in a Foreign Receivable Payable Notification In interface 520.

The operations 522 and 524 use a Maintain Foreign Receivable Payable inbound process agent 526 to create, change, or cancel a foreign receivable or payable in a Foreign Receivable Payable business object 530. The Foreign Receivable Payable business object 530 represents a receivable from or payable to a non-resident business partner.

Interactions between Process Components "Service Confirmation Processing" and "Accounting"

Figure 6:
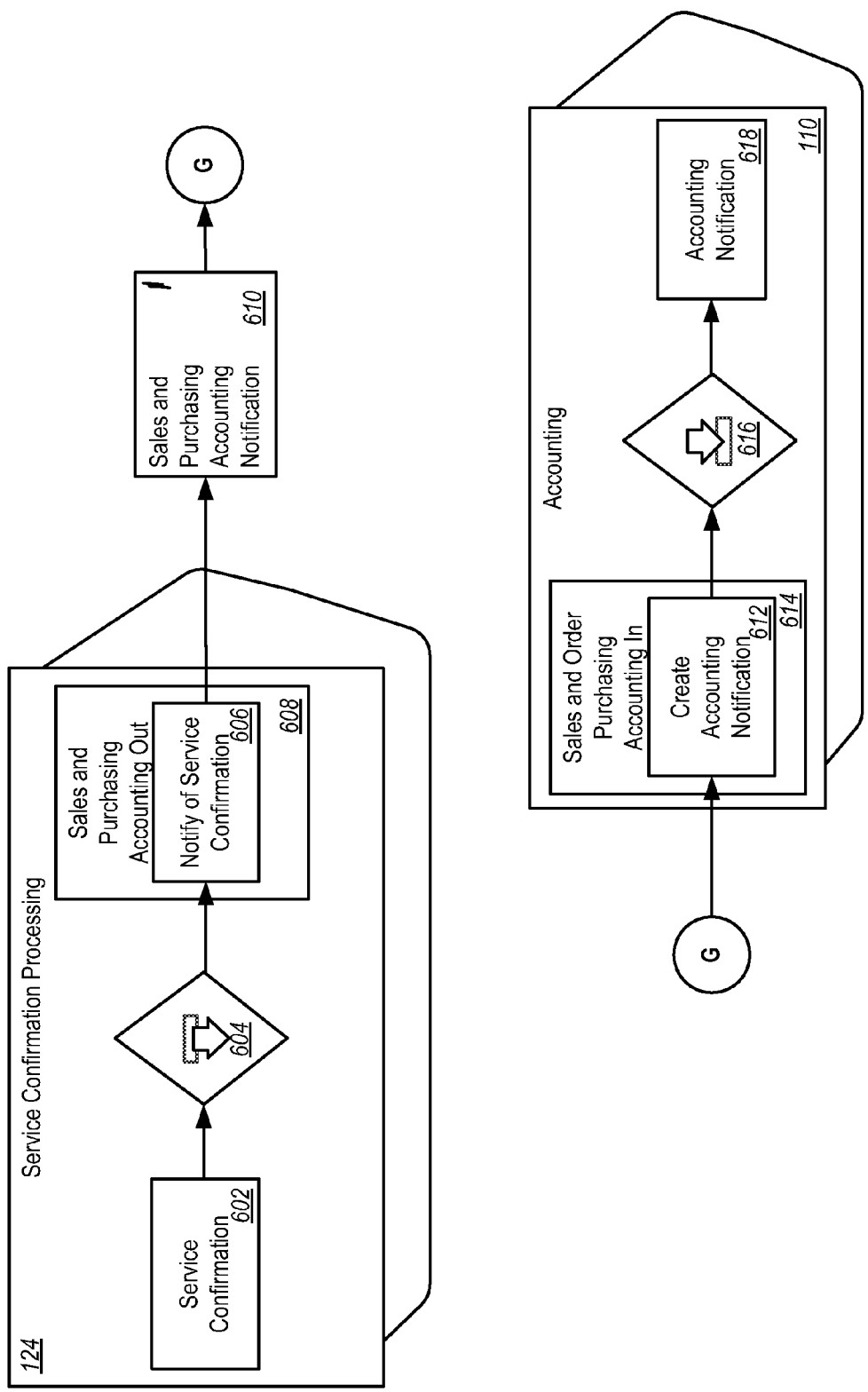
FIG. 6 is a block diagram showing interactions between a Service Confirmation Processing process component and an Accounting process component.

FIG. 6 is a block diagram showing interactions between a Service Confirmation Processing process component 124 and an Accounting process component 110 in the architectural design of FIG. 1. The Service Confirmation Processing process component 124 requests the creation, update, or cancellation of sales ledger accounts in the Accounting process component 110 when service confirmations are created, updated, or cancelled. In addition, the Accounting process component 110 can create or cancel accounting documents on the basis of service provisions.

As shown in FIG. 6, the Service Confirmation Processing process component 124 includes a Service Confirmation business object 602. The Service Confirmation business object 602 represents a record of services and spare parts that a service technician reports back after performing a service for a customer. The Service Confirmation business object 602 uses a Notify of Service Confirmation to Accounting outbound process agent 604 to invoke a Notify of Service Confirmation operation 606. The Notify of Service Confirmation operation 606 is included in a Sales and Purchasing Accounting Out interface 608. The Notify of Service Confirmation operation 606 notifies the Accounting process component 110 about the creation, change, or deletion of a service confirmation. In some implementations, the notification can include notification about the corresponding service provision. The Notify of Service Confirmation operation 606 sends a Sales and Purchasing Accounting Notification message 610 to the Accounting process component 110.

The Sales and Purchasing Accounting Notification message 610 is received by a Create Accounting Notification operation 612. The Create Accounting Notification operation 612 is included in a Sales and Order Purchasing Accounting In interface 614. The Create Accounting Notification operation 612 creates an accounting notification based on production order data received from production. The Create Accounting Notification operation 612 uses a Maintain Subledger Account based on Sales and Purchasing inbound process agent 616 to update an Accounting Notification business object 618. The Accounting Notification business object 618 represents a notification sent to the Financials deployment unit 102 by an operational component regarding a business transaction. For example, the Accounting Notification business object 618 can represent the operational business transaction in a standardized form for all business transaction documents and contains the data needed to valuate the business transaction.

Interactions between Process Components "Sales Order Processing" and "Due Item Processing"

Figure 7:
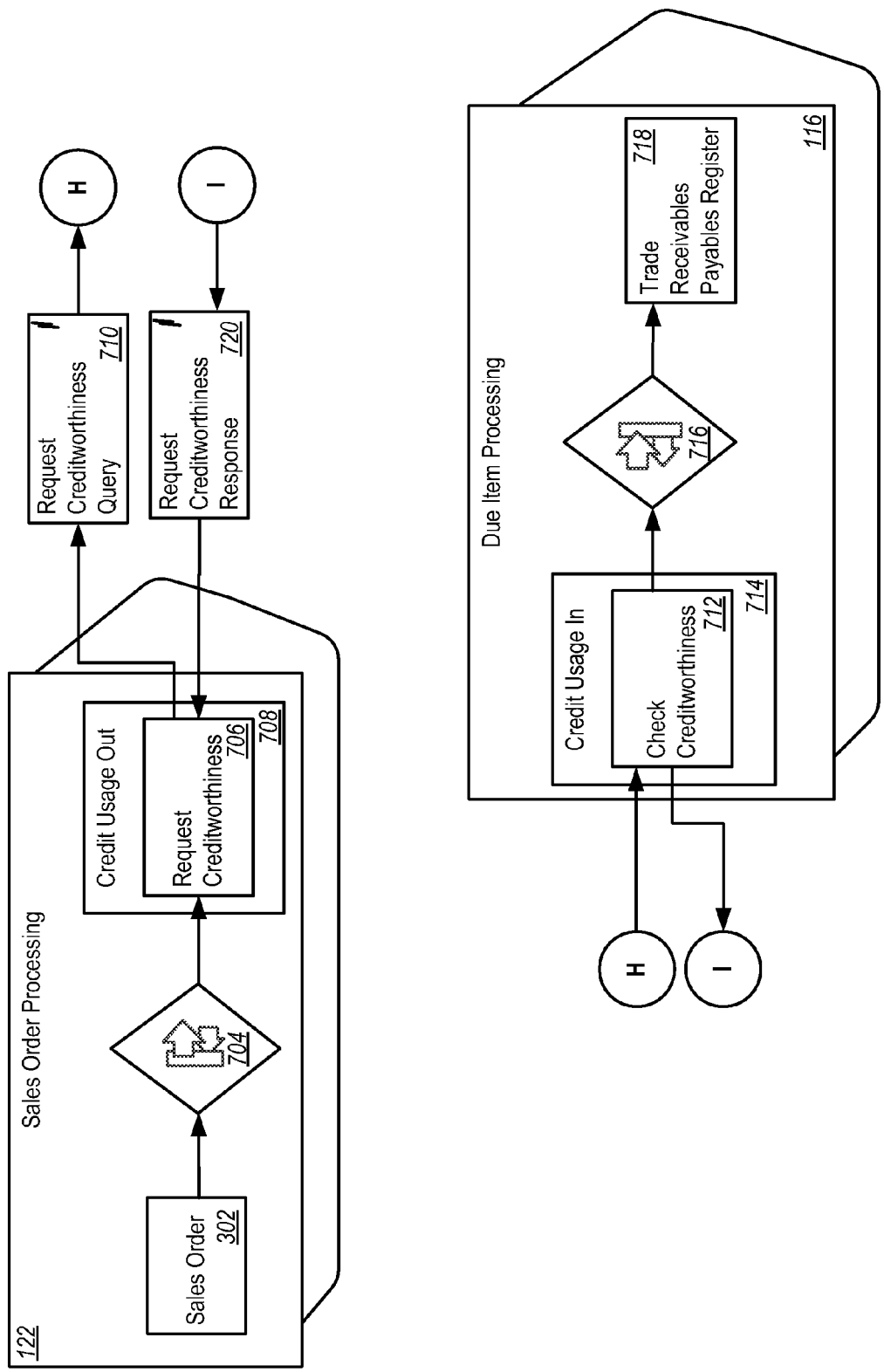
FIG. 7 is a block diagram showing interactions between the Sales Order Processing process component and the Due Item Processing process component.

FIG. 7 is a block diagram showing interactions between the Sales Order Processing process component 122 and the Due Item Processing process component 116 in the architectural design of FIG. 1. The interaction starts when a credit check is requested by the Sales Order Processing process component 122.

As shown in FIG. 7, the Sales Order Processing process component 122 includes the Sales Order business object 302. The Sales Order business object 302 represents an agreement between a seller and a customer concerning the sale and delivery of goods, as well as any services that are associated with these processes, on a specific date, for a specific quantity, and for a specific price.

The Sales Order business object 302 uses a Synchronous Request Creditworthiness from Sales Order to Due Item Processing synchronous outbound process agent 704 to invoke a Request Creditworthiness operation 706. The operation 706 checks whether a particular sales order is covered by the current credit limit of the customer. The Request Creditworthiness operation 706 is included in a Credit Usage Out interface 708. The Request Creditworthiness operation 706 sends a Request Creditworthiness Query message 710 to the Due Item Processing process component 116.

The Request Creditworthiness Query message 710 is received by a Check Creditworthiness operation 712. The operation 712 is included in a Credit Usage In interface 714. The Check Creditworthiness operation 712 is used to initiate the execution of a credit check. The operation 712 uses a Check Creditworthiness Based on Trade Receivables Payables Register synchronous inbound process agent 716 to update a Trade Receivables Payables Register business object 718. The Trade Receivables Payables Register business object 718 represents the register of all trade receivables and payables of a company from or to its business partners. The Check Creditworthiness operation 712 sends a Request Creditworthiness Response message 720 to update the Sales Order Processing process component 122 about the creditworthiness of a party.

Interactions between Process Components "Customer Invoice Processing" and "Accounting"

Figure 8:
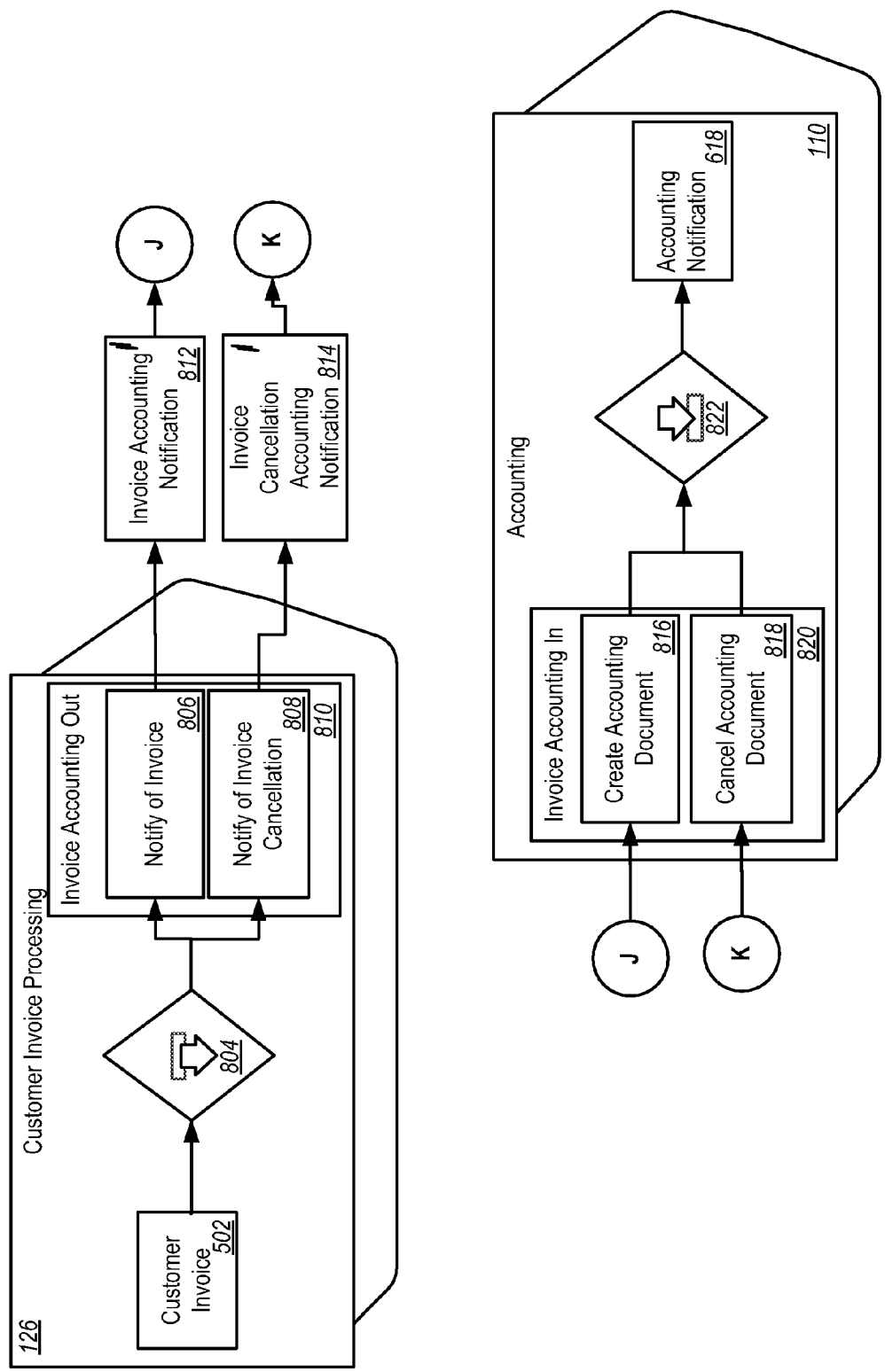
FIG. 8 is a block diagram showing interactions between the Customer Invoice Processing process component and the Accounting process component.

FIG. 8 is a block diagram showing interactions between the Customer Invoice Processing process component 126 and the Accounting process component 110 in the architectural design of FIG. 1. The interaction starts when the Customer Invoice Processing process component 126 requests the creation or cancellation of accounting documents from the Accounting process component 110.

As shown in FIG. 8, the Customer Invoice Processing process component 126 includes the Customer Invoice business object 502. The Customer Invoice business object 502 represents a binding statement of amounts receivable resulting, for example, from deliveries to a customer, services performed for a customer, adjustments to the receivables, or credit memos to a customer.

The Customer Invoice business object 502 uses a Notify of Customer Invoice to Accounting outbound process agent 804 to invoke a Notify of Invoice operation 806 or a Notify of Invoice Cancellation operation 808. The Notify of Invoice operation 806 and the Notify of Invoice Cancellation operation 808 are included in an Invoice Accounting Out interface 810. The Notify of Invoice Cancellation operation 806 informs the Accounting process component 110 about the cancellation of invoices or credit memos. The Notify of Invoice operation 806 informs the Accounting process component 110 about the creation of invoices or credit memos. The Notify of Invoice operation 806 sends an Invoice Accounting Notification message 812. The message 812 is a notification about the creation of a new supplier invoice or a change to an existing supplier invoice. The Notify of Invoice Cancellation operation 808 sends an Invoice Cancellation Accounting Notification message 814. The message 814 is a notification about the cancellation of a an incoming or outgoing invoice or credit memo, or of an item in such a business transaction.

A Create Accounting Document operation 816 receives the Invoice Accounting Notification message 812. The operation 816 creates an accounting document based on invoice data received from the Customer Invoice Processing process component 126. In some implementations, the received data can first be converted into an accounting notification from which one or more accounting documents are created according to the relevant sets of books. The Create Accounting Document operation 816 is included in an Invoice Accounting In interface 820.

A Cancel Accounting Document operation 818 receives the Invoice Cancellation Accounting Notification message 814. The operation 818 cancels an existing accounting document based on cancellation data received from the Customer Invoice Processing process component 126. In some implementations, the received data can be converted into an accounting notification from which one or more reversal accounting documents are created according to the relevant sets of books. The Cancel Accounting Document operation 818 is included in the Invoice Accounting In interface 820.

The Create Accounting Document operation 816 and the Cancel Accounting Document operation 818 both use a Maintain Accounting Document based on Invoice inbound process agent 822 to update the Accounting Notification business object 618. The Accounting Notification business object 618 represents a notification sent to the Financials deployment unit 102 by an operational component regarding a business transaction. For example, the Accounting Notification business object 618 can represent the operational business transaction in a standardized form for all business transaction documents and contains the data for valuating the business transaction.

Interactions between Process Components "Sales Order Processing" and "Customer Invoice Processing"

Figure 9:
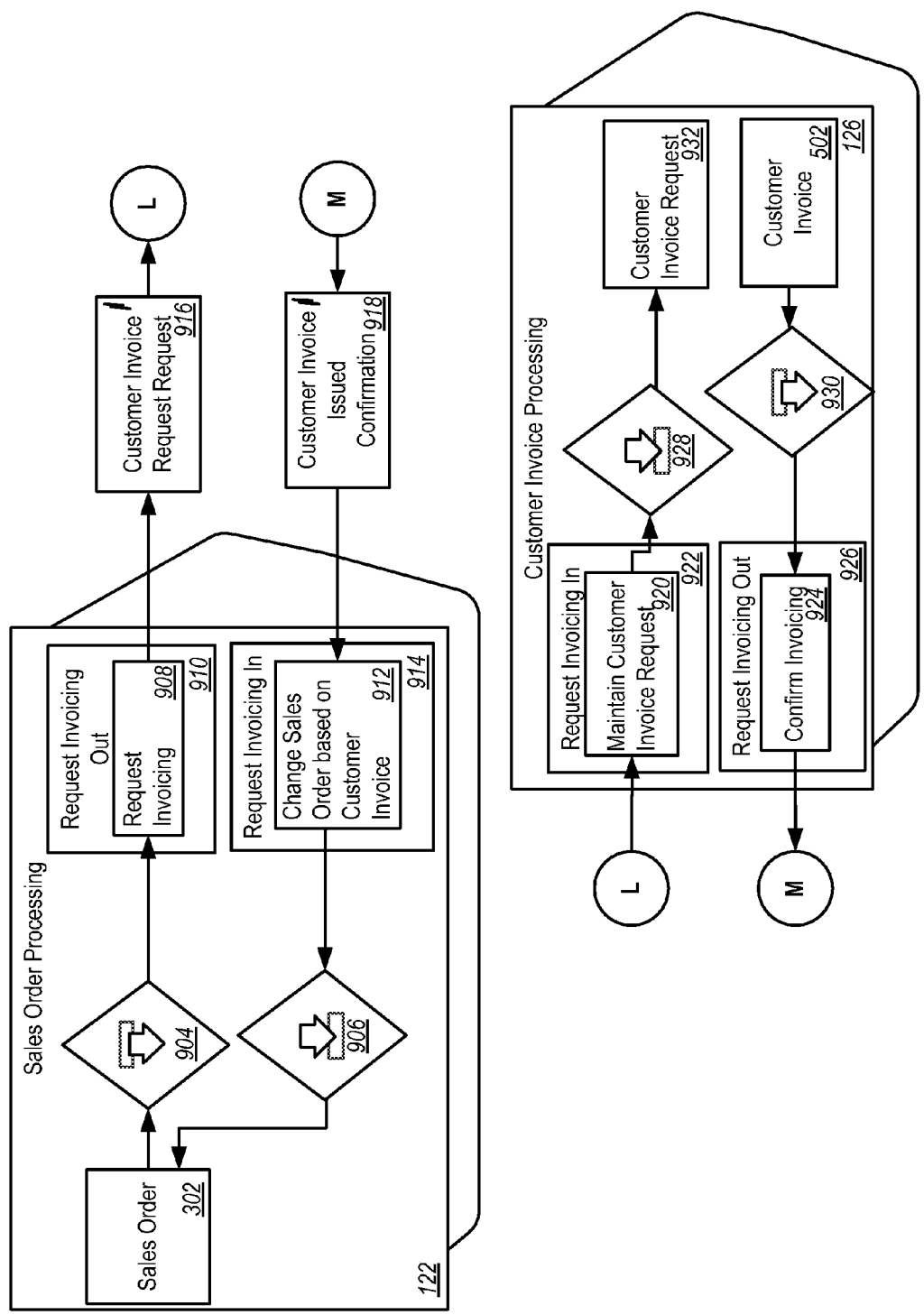
FIG. 9 is a block diagram showing interactions between the Sales Order Processing process component and the Customer Invoice Processing process component.

FIG. 9 is a block diagram showing interactions between the Sales Order Processing process component 122 and the Customer Invoice Processing process component 126 in the architectural design of FIG. 1. The interaction starts when the Sales Order Processing process component 122 requests the creation, update or cancellation of invoices from the Customer Invoice Processing process component 126. The Customer Invoice Processing process component 126 confirms the performed action to the requestor.

As shown in FIG. 9, the Sales Order Processing process component 122 includes the Sales Order business object 302. The Sales Order business object 302 represents an agreement between a seller and a customer concerning the sale and delivery of goods, as well as any services that are associated with these processes, on a specific date, for a specific quantity, and for a specific price. The Sales Order business object 302 uses a Request Invoicing from Sales Order to Customer Invoice Processing outbound process agent 904 to invoke a Request Invoicing operation 908. The operation 908 requests invoicing of a sales order. The point in time and dependence on other invoicing information such as delivery can be decided by invoicing process. The Request Invoicing operation 908 is included in a Request Invoicing Out interface 910. The Request Invoicing operation 908 generates a Customer Invoice Request Request message 916.

The Customer Invoice Request Request message 916 is received in a Maintain Customer Invoice Request operation 920. The Maintain Customer Invoice Request operation 920 creates, updates, or cancels a customer invoice request. The operation 920 is included in a Request Invoicing In interface 922. The Maintain Customer Invoice Request operation 920 uses a Maintain Customer Invoice Request inbound process agent 928 to update a Customer Invoice Request business object 932. The Customer Invoice Request business object 932 represents a request to create one or several customer invoices, or to take account of the data for the underlying business document when creating a customer invoice.

The Customer Invoice business object 502 uses a Confirm Customer Invoice to Sales Order Processing outbound process agent 930 to invoke a Confirm Invoicing operation 924. The operation 924 confirms that invoicing has taken place. The Confirm Invoicing operation 924 is included in a Request Invoicing Out interface 926. The operation 924 generates a Customer Invoice Issued Confirmation message 918.

A Change Sales Order based on Customer Invoice operation 912 receives the Customer Invoice Issued Confirmation message 918. The Change Sales Order based on Customer Invoice operation 912 is included in a Request Invoicing In interface 914. The Change Sales Order based on Customer Invoice operation 912 updates a sales order based on changes from the customer invoice. The operation 912 uses a Change Sales Order based on Customer Invoice inbound process agent 906 to update the Sales Order business object 302.

Interactions between Process Components "Service Confirmation Processing" and "Customer Invoice Processing"

Figure 10:
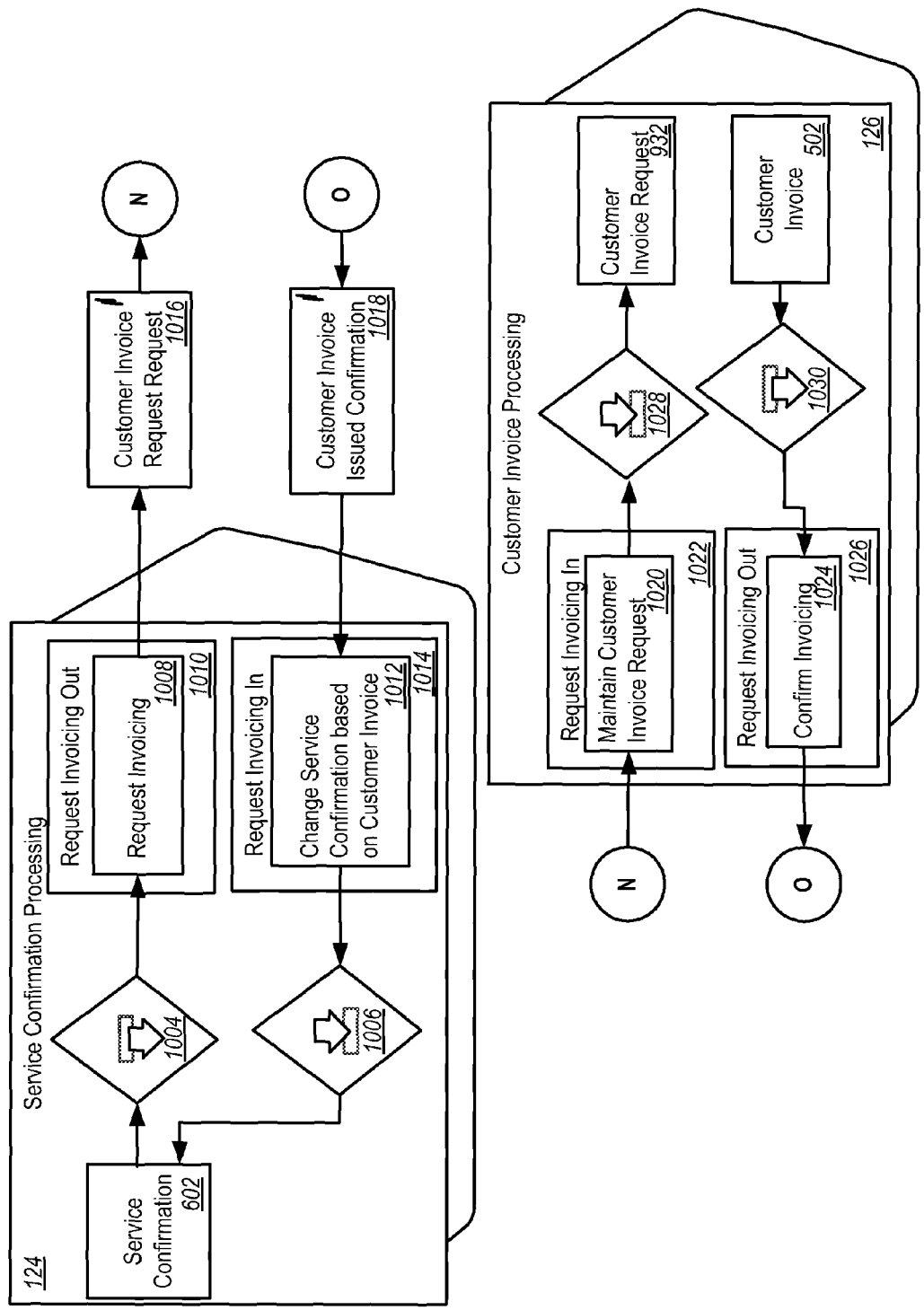
FIG. 10 is a block diagram showing interactions between the Service Confirmation Processing process component and the Customer Invoice Processing process component.

FIG. 10 is a block diagram showing interactions between the Service Confirmation Processing process component 124 and the Customer Invoice Processing process component 126 in the architectural design of FIG. 1. The interaction starts when the Service Confirmation Processing process component 124 requests the creation, update or cancellation of invoices from the Customer Invoice Processing process component 126. The Customer Invoice Processing process component 126 confirms the performed action to the requestor.

As shown in FIG. 10, the Service Confirmation Processing process component 124 includes the Service Confirmation business object 602. The Service Confirmation business object 602 represents a record of services, spare parts, and expenses that a service technician reports back after performing a service for a customer.

The Service Confirmation business object 602 uses a Request Invoicing from Service Confirmation to Customer Invoice Processing outbound process agent 1004 to invoke a Request Invoicing operation 1008. The operation 1008 requests invoicing of services provided and spare parts consumed based on information in the service confirmation. The Request Invoicing operation 1008 is included in a Request Invoicing Out interface 1010. The Request Invoicing operation 1008 sends a Customer Invoice Request Request message 1016 to the Customer Invoice Processing process component 126.

A Maintain Customer Invoice Request operation 1020 receives the message 1016. The Maintain Customer Invoice Request operation 1020 creates, updates, or cancels a customer invoice request. The operation 1020 is included in a Request Invoicing In interface 1022. The Maintain Customer Invoice Request operation 1020 uses a Maintain Customer Invoice Request inbound process agent 1028 to update a Customer Invoice Request business object 932. The Customer Invoice Request business object 932 represents a request to create one or several customer invoices, or to take account of the data for the underlying business document when creating a customer invoice.

The Customer Invoice Processing process component 126 includes the Customer Invoice business object 502. The Customer Invoice business object 502 represents a binding statement of amounts receivable resulting, for example, from deliveries to a customer, services performed for a customer, adjustments to these receivables, or credit memos to a customer.

The Customer Invoice business object 502 uses a Confirm Customer Invoice to Service Confirmation Processing outbound process agent 1030 to invoke a Confirm Invoicing operation 1024. The operation 1024 confirms that invoicing has taken place. The Confirm Invoicing operation 1024 is included in a Request Invoicing Out interface 1026. The operation 1024 sends a Customer Invoice Issued Confirmation message 1018 to the Service Confirmation Processing process component 124.

A Change Service Confirmation based on Customer Invoice operation 1012 receives the Customer Invoice Issued Confirmation message 1018. The Change Service Confirmation based on Customer Invoice operation 1012 is included in a Request Invoicing In interface 1014. The Change Service Confirmation based on Customer Invoice operation 1012 updates a service confirmation based on information from related customer invoices. The operation 1012 uses a Change Service Confirmation based on Customer Invoice inbound process agent 1006 to update the Service Confirmation business object 602.

Interactions between Process Components "Payment Authorization" and "Settlement Processing at Clearing House"

Figure 11:
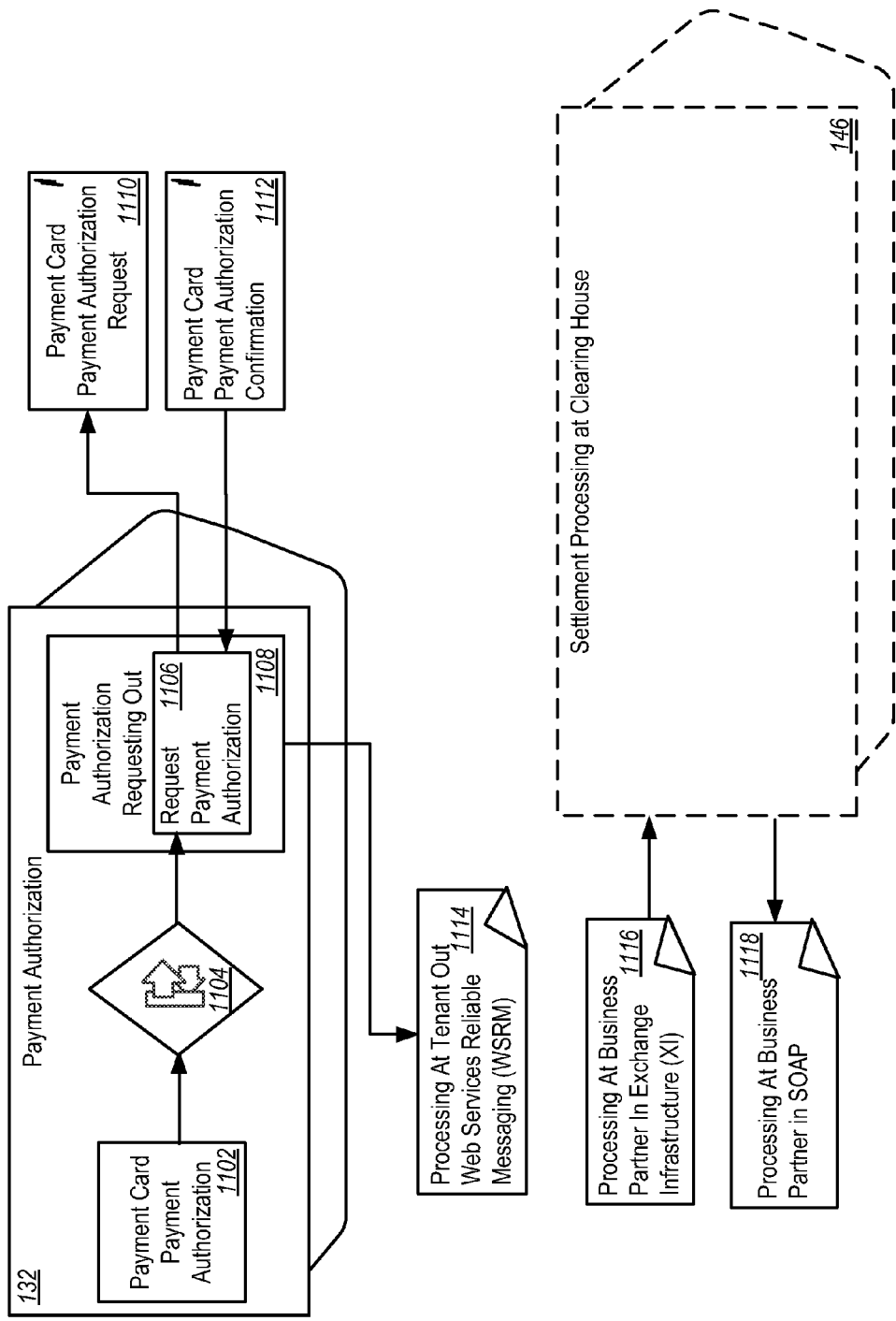
FIG. 11 is a block diagram showing interactions between a Payment Authorization process component and a Settlement Processing at Clearing House process component.

FIG. 11 is a block diagram showing interactions between a Payment Authorization process component 132 and a Settlement Processing at Clearing House process component 146 in the architectural design of FIG. 1. The interaction starts with the Payment Authorization process component 132 receiving a request for payment authorization from the Settlement Processing at Clearing House process component 146.

As shown in FIG. 11, the Payment Authorization process component 132 includes a Payment Card Payment Authorization business object 1102. The Payment Card Payment Authorization business object 1102 represents an authorization for a payment made using a payment card. The Payment Card Payment Authorization business object 1102 represents an authorization for a payment made using a payment card. In some implementations, the authorization can contain payment information including a description of the goods and services purchased, the authorization request, and the result of the authorization request based on the response from a clearing.

The Payment Card Payment Authorization business object 1102 uses a Request Payment Card Payment Authorization synchronous outbound process agent 1104 to invoke a Request Payment Authorization operation 1106. The Request Payment Authorization operation 1106 is included in a Payment Authorization Requesting Out interface 1108. The Payment Authorization process component 132 receives information from a Processing at Tenant Out Web Services Reliable Messaging (WSRM) communication channel template 1114. The communication channel template 1114 can define protocols and parameters used for communication with an external party. The Request Payment Authorization operation 1106 sends to a clearing house a request for authorization of a payment made by a payment card. The Request Payment Authorization operation 1106 sends a Payment Card Payment Authorization Request message 1110 to the Settlement Processing at Clearing House processing component 146. The Request Payment Authorization operation 1106 receives a Payment Card Payment Authorization Confirmation message 1112 from the Settlement Processing at Clearing House processing component 146.

The Settlement Processing at Clearing House process component 146 receives information from a Processing at Business Partner In Exchange Infrastructure (XI) communication channel template 1116. The communication channel template 1116 can define protocols and parameters used for communication with an external party. The Settlement Processing at Clearing House process component 146 sends information to the Payment Authorization process component 132 using a Processing at Business Partner in SOAP communication channel template 1118. The communication channel template 1118 can define protocols and parameters used for communication with an external party.

Interactions between Process Components "Pricing Engine" and "External Tax Calculation"

Figure 12:
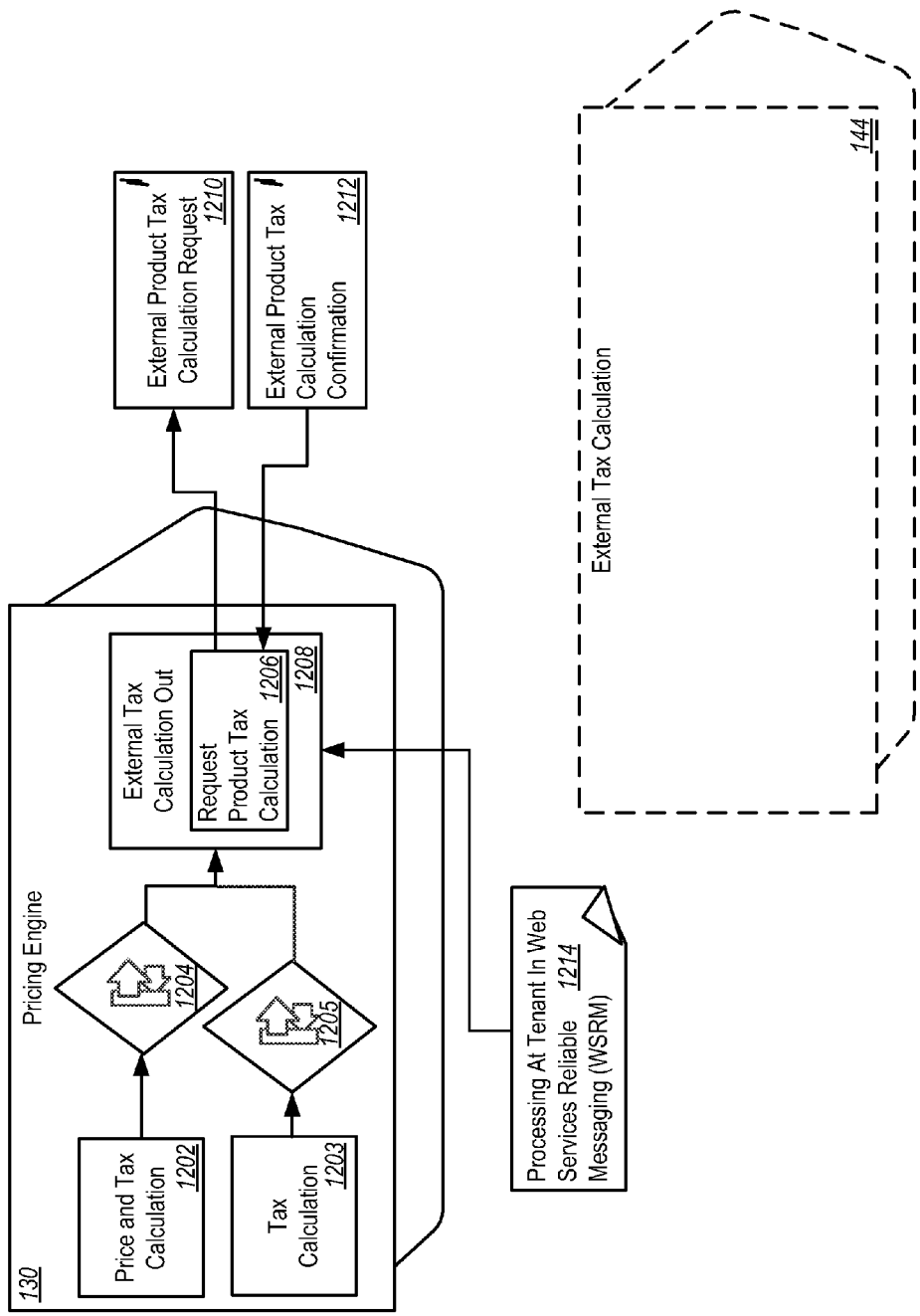
FIG. 12 is a block diagram showing interactions between a Pricing Engine process component and an External Tax Calculation process component.

FIG. 12 is a block diagram showing interactions between a Pricing Engine process component 130 and an External Tax Calculation process component 144 in the architectural design of FIG. 1. The interaction starts with the Pricing Engine process component 130 requesting a tax calculation from the External Tax Calculation process component 144.

As shown in FIG. 12, the Pricing Engine process component 130 includes a Price and Tax Calculation business object 1202 and a Tax Calculation business object 1203. The Price and Tax Calculation business object 1202 represents a summary of the determined price and tax components for a business case. The Tax Calculation business object 1203 represents a summary of the determined and calculated tax elements of a business case.

The Price and Tax Calculation business object 1202 uses a Synchronous Request Product Tax Calculation from Price and Tax Calculation to External Tax Calculation synchronous outbound process agent 1204 to invoke a Request Product Tax Calculation operation 1206. The Tax Calculation business object 1203 uses a Synchronous Request Product Tax Calculation from Tax Calculation to External Tax Calculation synchronous outbound process agent 1205 to invoke the Request Product Tax Calculation operation 1206. The operation 1206 requests a product tax calculation from the External Tax Calculation process component 144. The Request Product Tax Calculation operation 1206 is included in an External Tax Calculation Out interface 1208. The Pricing Engine process component 130 sends information to the External Tax Calculation process component 144 using a Processing at Tenant In Web Services Reliable Messaging (WSRM) communication channel template 1214. The communication channel template 1214 can define protocols and parameters used for communication with an external party.

The Request Product Tax Calculation operation 1206 sends an External Product Tax Calculation Request message 1210 to the External Tax Calculation process component 144. The Request Product Tax Calculation operation 1206 receives an External Product Tax Calculation Confirmation message 1212 from the External Tax Calculation process component 144.

Interactions between Process Components "Customer Quote Processing" and "Due Item Processing"

Figure 13:
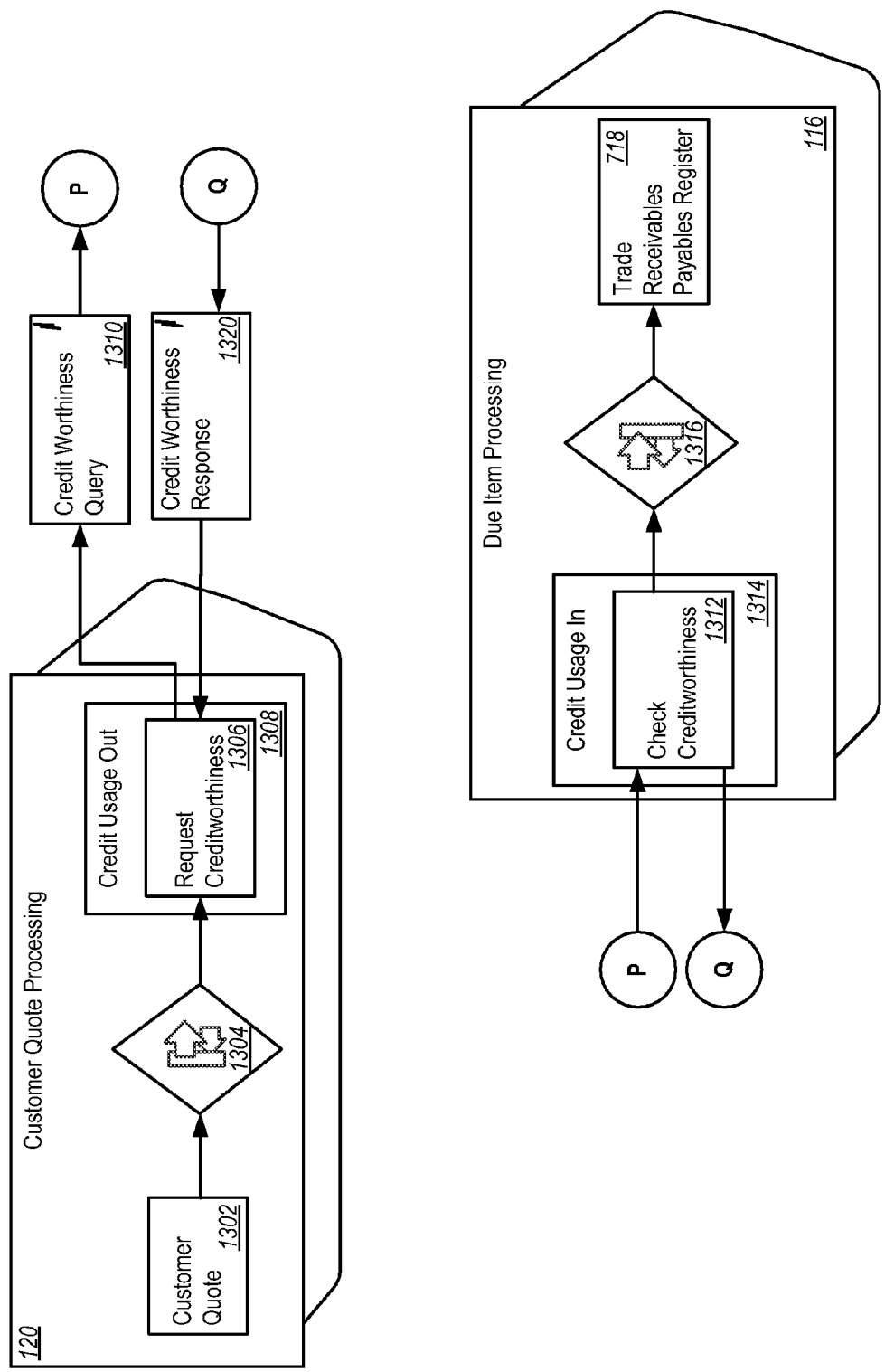
FIG. 13 is a block diagram showing interactions between a Customer Quote Processing process component and the Due Item Processing process component.

FIG. 13 is a block diagram showing interactions between a Customer Quote Processing process component 120 and the Due Item Processing process component 116 in the architectural design of FIG. 1. The Due Item Processing process component 120 requests a credit check from the Customer Quote Processing component 116.

As shown in FIG. 13, the Customer Quote Processing process component 120 includes the Customer Quote business object 1302. The Customer Quote business object 1302 represents an offer by a seller to a customer for the delivery of goods or services according to fixed terms. In general, the offer is legally binding for the seller for a specific period of time.

The Customer Quote business object 1302 uses a Synchronous Request Creditworthiness from Customer Quote to Due Item Processing synchronous outbound process agent 1304 to invoke a Request Creditworthiness operation 1306. The operation 1306 verifies the data or value of a current document against an actual credit standing of customer. The Request Creditworthiness operation 1306 is included in a Credit Usage Out interface 1308. The Request Creditworthiness operation 1306 sends a Request Credit Worthiness Query message 1310 to the Due Item Processing process component 116.

The Request Credit Worthiness Query message 1310 is received by a Check Creditworthiness operation 1312. The operation 1312 is included in a Credit Usage In interface 1314. The Check Creditworthiness operation 1312 is used to initiate the execution of a credit check. The operation 1312 uses a Check Creditworthiness Based on Trade Receivables Payables Register synchronous inbound process agent 1316 to update the Trade Receivables Payables Register business object 1318. The Trade Receivables Payables Register business object 1318 represents the register of all trade receivables and payables of a company from or to its business partners. The Check Creditworthiness operation 1312 sends a Request Credit Worthiness Response message 1320 to update the Customer Quote Processing process component 120 about the creditworthiness of a party.

Interactions between Process Components "Payment Processing at Business Partner" and "Payment Processing"

Figure 14:
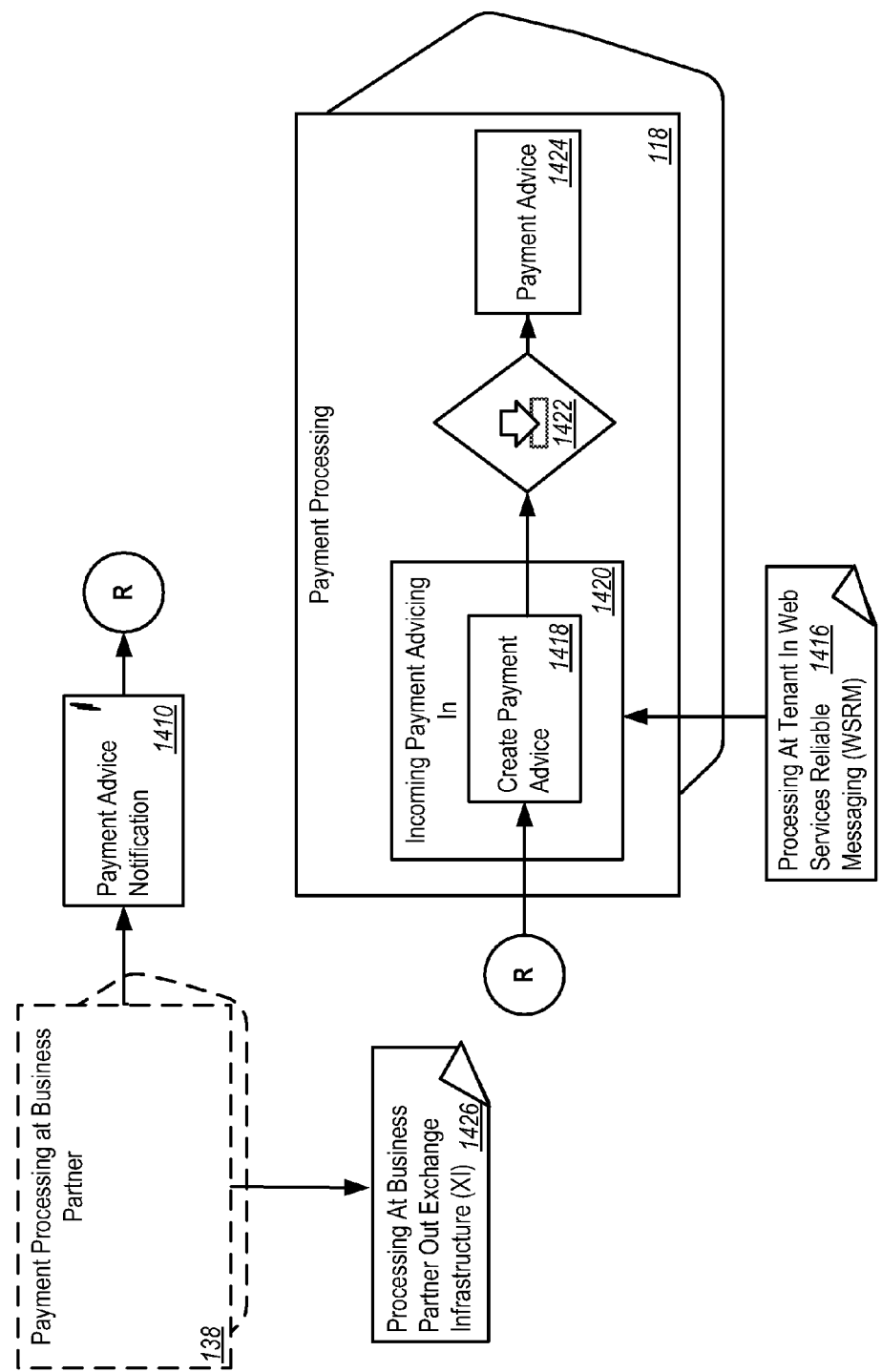
FIG. 14 is a block diagram showing interactions between a Payment Processing at Business Partner process component and the Payment Processing process component.

FIG. 14 is a block diagram showing interactions between a Payment Processing at Business Partner process component 138 and the Payment Processing process component 118 in the architectural design of FIG. 1. The interaction starts when the Payment Processing at Business Partner process component 138 receives a payment advice from a business partner.

As shown in FIG. 14, the Payment Processing at Business Partner process component 138 sends a Payment Advice Notification message 1410 to the Payment Processing process component 118. A Create Payment Advice operation 1418 receives the Payment Advice Notification message 1410. The Create Payment Advice operation 1418 creates a payment advice sent from a business partner or house bank concerning future payment transactions. The operation 1418 is included in an Incoming Payment Advicing In interface 1420. The Payment Processing process component 118 sends information to the Payment Processing at Business Partner process component 138 using a Processing at Tenant In Web Services Reliable Messaging (WSRM) communication channel template 1416. The communication channel template 1416 can define protocols and parameters used for communication with an external party.

The Create Payment Advice operation 1418 uses a Maintain Payment Advice inbound process agent 1422 to update a Payment Advice business object 1424. The Payment Advice business object 1424 represents an announcement of a payment transaction by a business partner to the company, specifying payment reasons.

The Payment Processing at Business Partner process component 138 sends information to the Payment Processing process component 118 using a Processing at Business Partner Out Exchange Infrastructure (XI) communication channel template 1426. The communication channel template 1426 can define protocols and parameters used for communication with an external party.

Interactions between Process Components "Sales Order Processing" and "Accounting"

Figure 15:
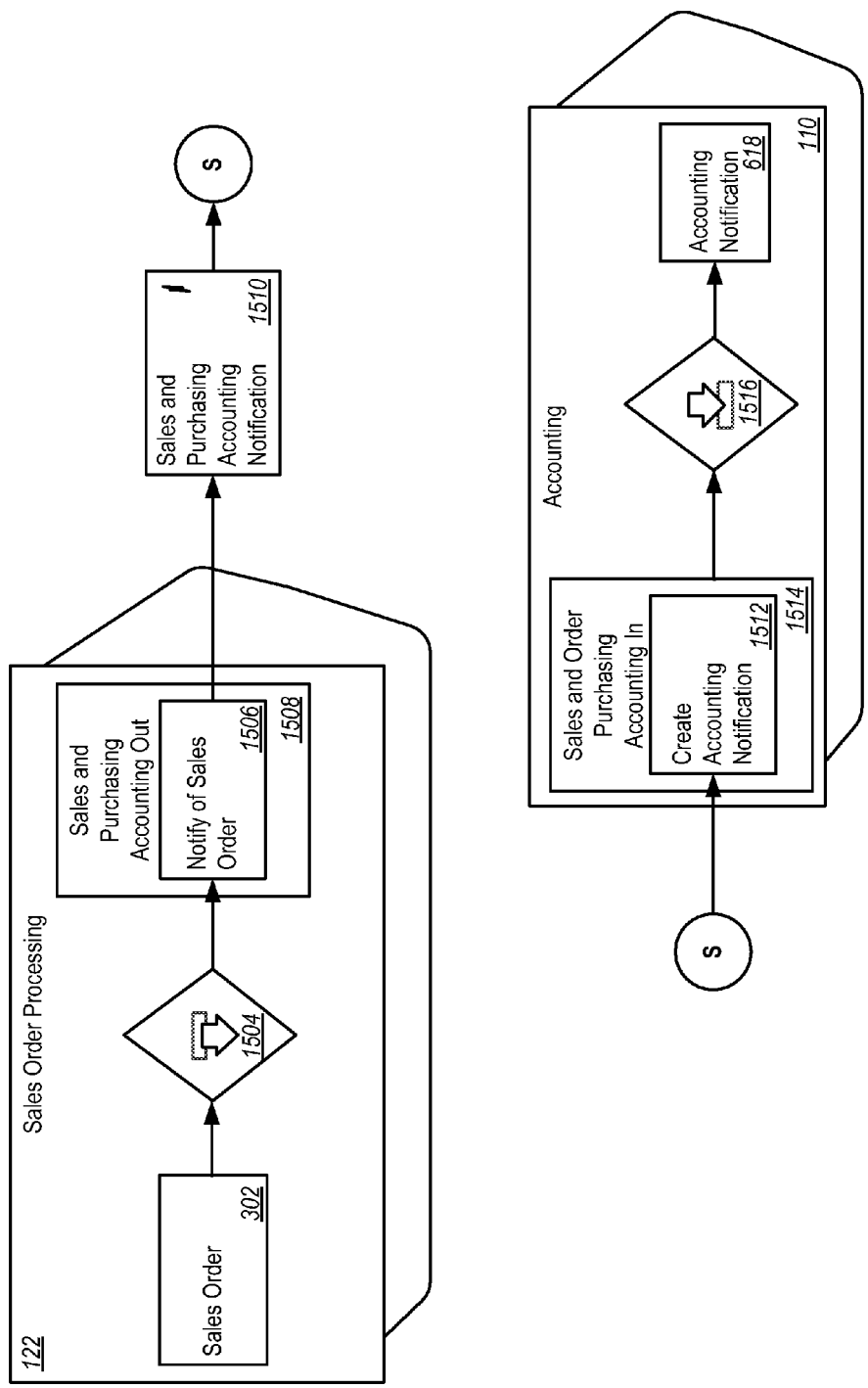
FIG. 15 is a block diagram showing interactions between the Sales Order Processing process component and the Accounting process component.

FIG. 15 is a block diagram showing interactions between the Sales Order Processing process component 122 and the Accounting process component 110 in the architectural design of FIG. 1. The interaction starts when a sales order is created or updated. The Sales Order Processing process component 122 requests the creation or update of a subledger account, based on sales, from the Accounting process component 110. In some implementations, if a sales order includes a service provision for a service item, upon completion or cancellation of the service item, the creation or cancellation of accounting documents is requested from the Accounting process component 110.

As shown in FIG. 15, the Sales Order Processing component 122 includes the Sales Order business object 302. The Sales Order business object 302 represents an agreement between a seller and a customer concerning the sale and delivery of goods, as well as any services that are associated with these processes, on a specific date, for a specific quantity, and for a specific price.

The Sales Order business object 302 uses a Notify of Sales Order to Accounting outbound process agent 1504 to invoke a Notify of Sales Order operation 1506. The Notify of Sales Order operation 1506 informs the Accounting process component 110 when a sales order is created, updated, or changed. Also, when a sales order contains a service provision, accounting can be notified when the service provision is created or cancelled. The operation 1506 is included in a Sales and Purchasing Accounting Out interface 1508. The operation 1506 sends a Sales and Purchasing Accounting Notification message 1510.

A Create Accounting Notification operation 1512 receives the Sales and Purchasing Accounting Notification message 1510. The operation 1512 creates an accounting notification based on order data received from the Sales Order Processing process component 112. The operation 1512 is included in a Sales and Order Purchasing Accounting In interface 1514. The Create Accounting Notification operation 1512 uses a Maintain Subledger Account based on Sales and Purchasing inbound process agent 1516 to update the Accounting Notification business object 618. The Accounting Notification business object 618 represents a notification sent to the Financial Accounting deployment unit 102 by an operational component regarding a business transaction. The Accounting Notification business object 618 also represents the business transaction in a standardized form for all business transaction documents and contains the data needed to valuate the business transaction.

Interactions between Process Components "Payment Processing" and "Payment Order Processing at House Bank"

Figure 16:
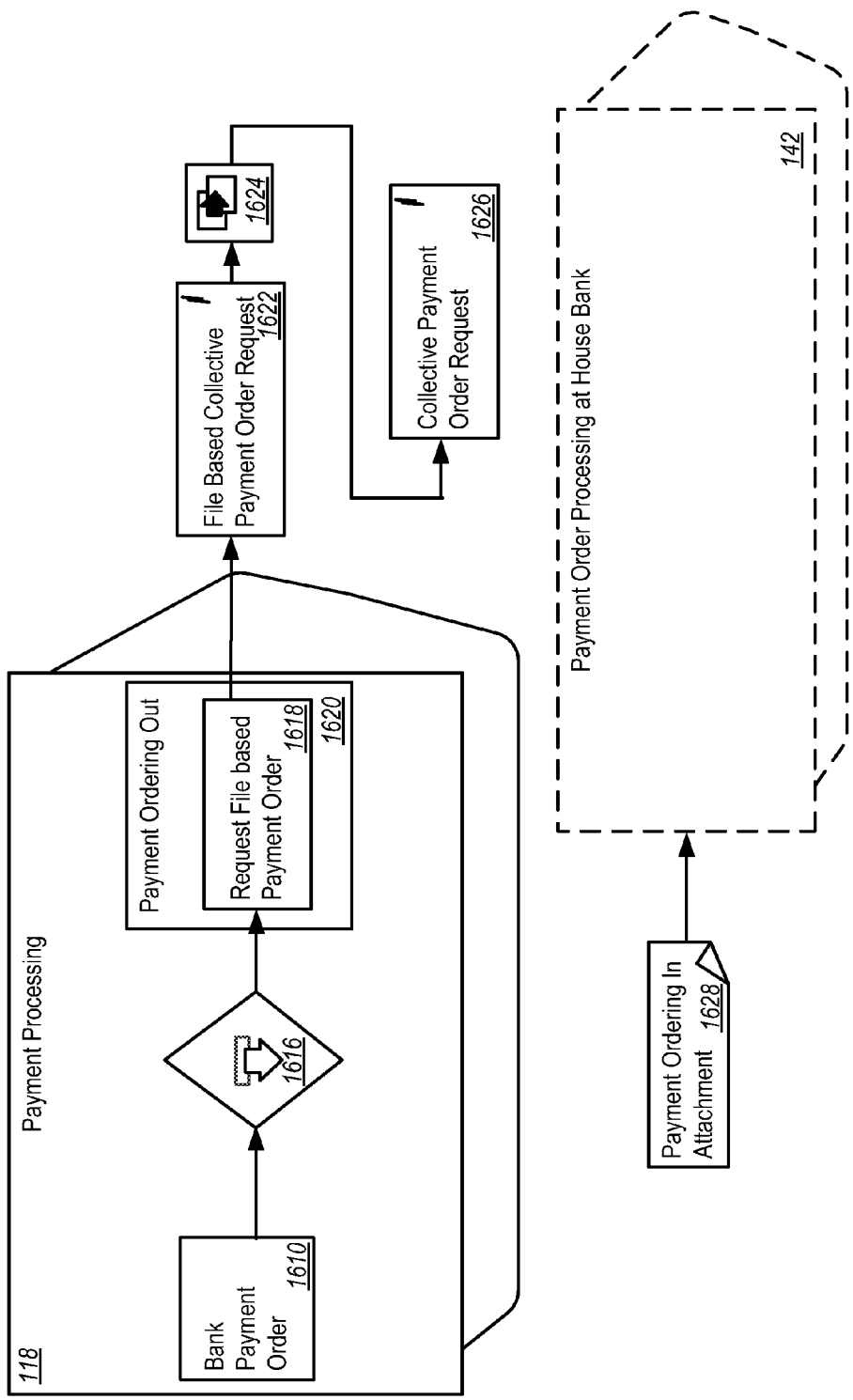
FIG. 16 is a block diagram showing interactions between the Payment Processing process component and a Payment Order Processing at House Bank process component.

FIG. 16 is a block diagram showing interactions between the Payment Processing process component 118 and a Payment Order Processing at House Bank process component 142 in the architectural design of FIG. 1. The interaction starts with the request for the execution of bank transfers for Germany with file format DTAZV. The communication can either be direct or based on a file exchange.

As shown in FIG. 16, the Payment Processing process component 118 includes a Bank Payment Order business object 1610. The Bank Payment Order business object 1610 represents an order to a house bank to make a transfer or direct debit from a specified house bank account to fulfill a payment order.

The Bank Payment Order business object 1610 uses a Request File Based Payment Order from Bank Payment Order to House Bank outbound process agent 1616 to invoke a Request File based Payment Order operation 1618. The Request File based Payment Order operation 1618 instructs a house bank, using a file, to make a bank transfer, a direct debit, an outgoing check, or a bill of exchange payable. The operation 1618 is included in a Payment Ordering Out interface 1620. The Request File based Payment Order operation 1618 sends a File Based Collective Payment Order Request message 1622. The File Based Collective Payment Order Request message 1622 uses Mapping Entity 1624 to transform the file-based message type to a Collective Payment Order Request message 1626 that is received by the Payment Order Processing at House Bank process component 142. The Collective Payment Order Request message 1626 is in a format that the house bank (e.g., a bank located in Germany) can understand. The Payment Order Processing at House Bank process component 142 receives information from a Payment Order Request communication channel template 1628. The communication channel template 1628 can define protocols and parameters used for communication with an external party.

Interactions between Process Components "Customer Quote Processing" and "Financial Accounting Master Data Management"

Figure 17:
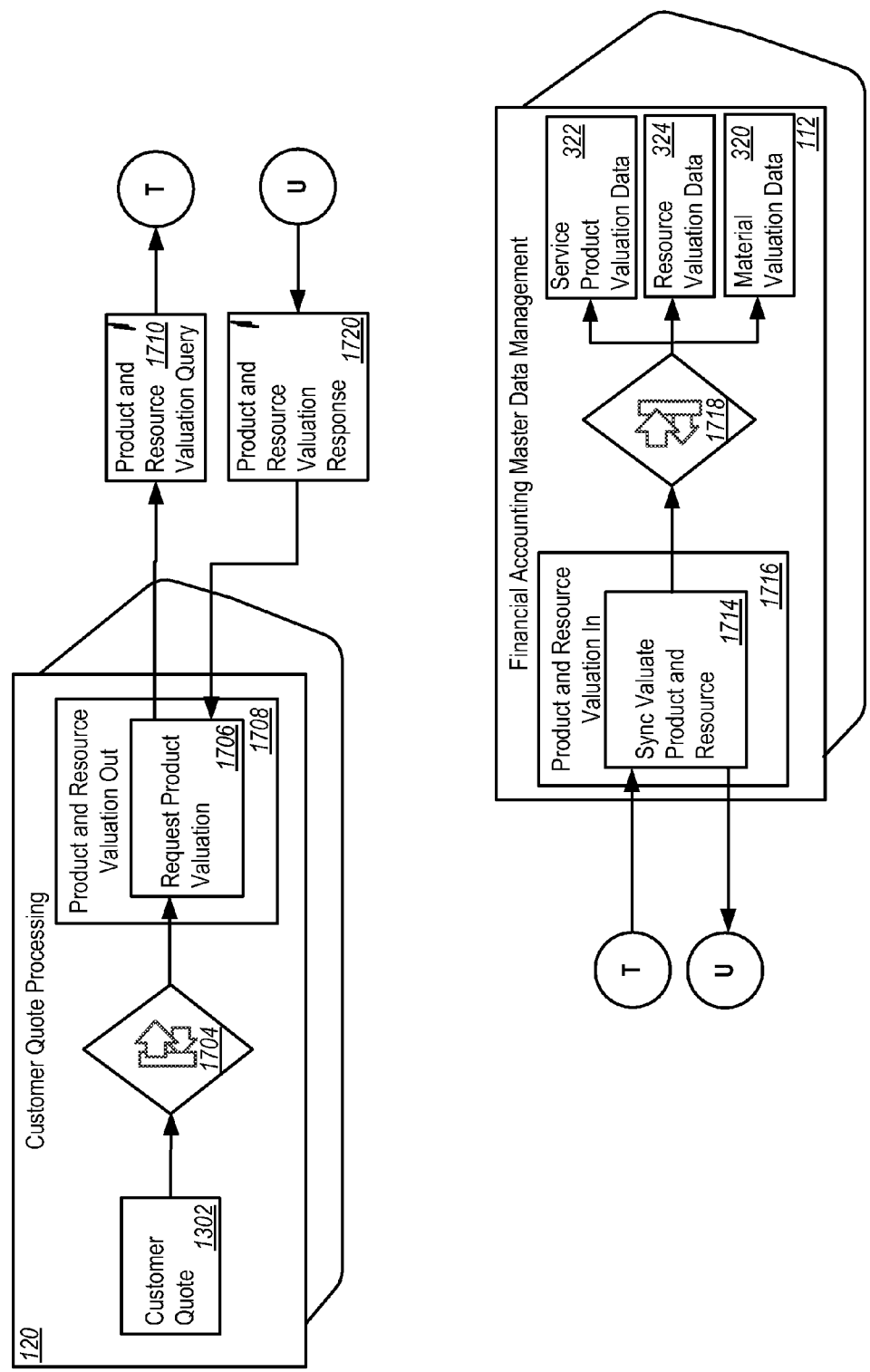
FIG. 17 is a block diagram showing interactions between the Customer Quote Processing process component and the Financial Accounting Master Data Management process component.

FIG. 17 is a block diagram showing interactions between the Customer Quote Processing process component 120 and the Financial Accounting Master Data Management process component 112 in the architectural design of FIG. 1. The Customer Quote Processing process component 120 requests the product valuation price from the Financial Accounting Master Data Management process component 112 when a customer quote is created or changed. As shown in FIG. 17, the Customer Quote Processing process component 120 includes a Customer Quote business object 1302. The Customer Quote business object 1302 represents an offer by a seller to a customer for the delivery of goods or services according to fixed terms. The offer can be legally binding for the seller for a specific period of time.

The Customer Quote business object 1302 uses a Synchronous Request Product Valuation from Customer Quote to Financial Accounting Master Data synchronous outbound process agent 1704 to invoke a Request Product Valuation operation 1706. The Request Product Valuation operation 1706 is included in a Product and Resource Valuation Out interface 1708. The operation 1706 requests a product valuation. The operation 1706 sends a Product and Resource Valuation Query message 1710 to the Financial Accounting Master Data Management process component 112.

A Synchronous Valuate Product and Resource operation 1714 receives the Product and Resource Valuation Query message 1710. The operation 1714 is included in a Product and Resource Valuation In interface 1716. The operation 1714 valuates one or more products or resources with internal valuation prices or internal cost rates. In some implementations, the product or resource can be valuated as an individual object or in the context of a business transaction. The result of the valuation for a product or resources can be a price and an amount, that can be optional, provided that a quantity was entered for the valuation. The operation 1714 uses a Synchronous Valuate Product and Resource synchronous inbound process agent 1718 to update either the Material Valuation Data business object 320, the Service Product Valuation Data business object 322, or the Resource Valuation Data business object 324. The Material Valuation Data business object 320 represents data that references a material or material group for valuating business transactions, for cost estimates, and for value-based management of material inventories. In particular, business object 320 contains internal valuation prices for a material or material group. The Service Product Valuation Data business object 322 represents data that references a service product or service product group for the valuation of business transactions and for cost estimates and cost accounting. For example, business object 322 contains the internal cost rates for a service product or service product group. The Resource Valuation Data business object 324 represents data that references a resource or resource group for the valuation of business transactions and for cost estimates and cost accounting. For example, business object 324 contains the internal cost rates for a resource or resource group.

The Financial Accounting Master Data Management process component 112 sends a Product and Resource Valuation Response message 1720 to the Customer Quote Processing process component 120.

Interactions between Process Components "Bank Statement Creation at Bank" and "Payment Processing"

Figure 18:
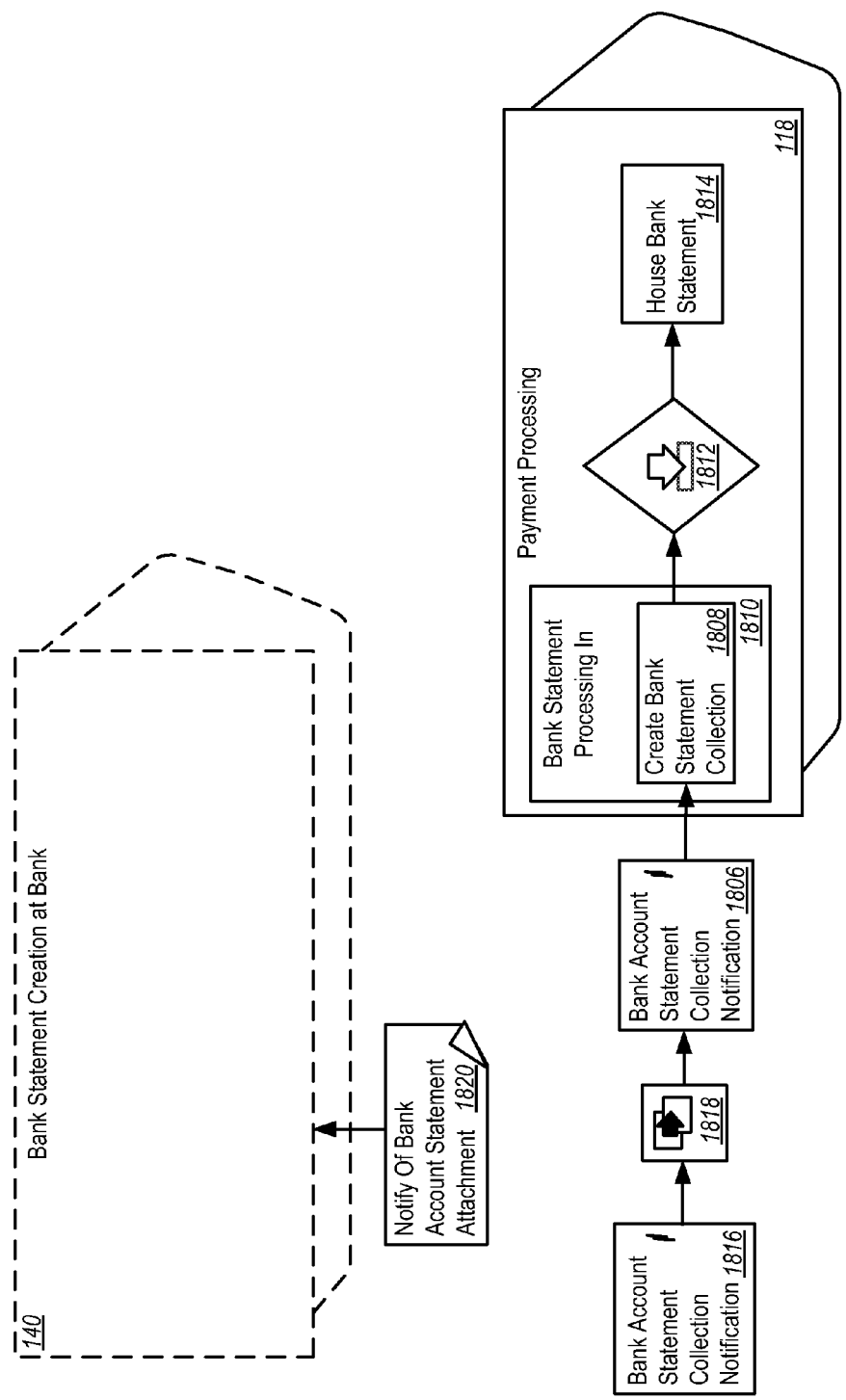
FIG. 18 is a block diagram showing interactions between a Bank Statement Creation at Bank process component and the Payment Processing process component.

FIG. 18 is a block diagram showing interactions between a Bank Statement Creation at Bank process component 140 and the Payment Processing process component 118 in the architectural design of FIG. 1. The interaction starts when the Bank Statement Creation at Bank process component 140 notifies the Payment Processing process component 118 about transactions on a bank account. In some implementations, a bank account statement can be in a United States file format (e.g., BAI2_ST). As shown in FIG. 18, a Bank Account Statement Collection Notification message 1816 is sent to the Payment Processing process component 118 by the Bank Statement Creation at Bank process component 140. The Bank Account Statement Collection Notification message 1816 uses Mapping Entity 1818 to transform the formatted message to a Bank Account Statement Collection Notification message 1806. The message 1806 is received in the Payment Processing process component 118 by a Create Bank Statement operation 1808. The Create Bank Statement Collection operation 1808 is included in a Bank Statement Processing In interface 1810. The Create Bank Statement Collection operation 1808 creates a collection of bank statements in the Payment Processing process component 118. A Maintain Bank Statement inbound process agent 1812 updates a House Bank Statement business object 1814. The House Bank Statement business object 1814 represents a legally binding notification from the house bank about the transactions within a specific time period at a house bank account with a defined starting and closing balance.

The Bank Statement Creation at Bank process component 124 receives information from the Payment Processing process component 118 using a Notify Of Bank Account Statement Attachment communication channel template 1820. The communication channel template 1820 can define protocols and parameters used for communication with an external party.

Interactions between Process Components "Payment Processing" and "Payment Processing at Business Partner"

Figure 19:
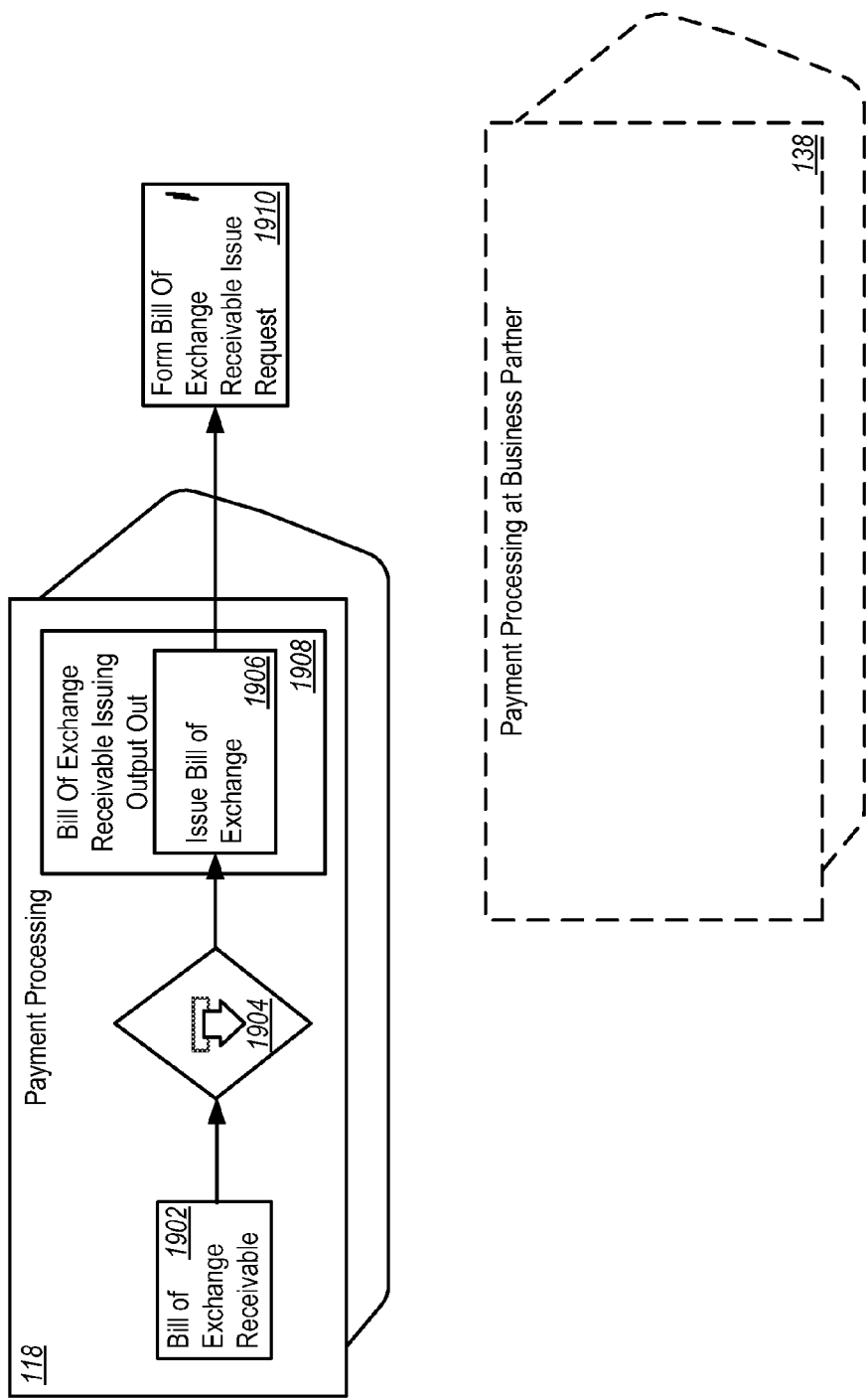
FIG. 19 is a block diagram showing interactions between the Payment Processing process component and the Payment Processing at Business Partner process component.

FIG. 19 is a block diagram showing interactions between the Payment Processing process component 118 and the Payment Processing at Business Partner process component 138 in the architectural design of FIG. 1. The interaction starts with the transfer of a printed bill of exchange receivable that is sent to the business partner.

As shown in FIG. 19, the Payment Processing process component 118 includes a Bill of Exchange Receivable business object 1902. The Bill of Exchange Receivable business object 1902 represents a bill of exchange issued either by a company or by a business partner for the benefit of the company. The business object 1902 uses an Issue Bill Of Exchange Receivable to Business Partner outbound process agent 1904 to invoke an Issue Bill of Exchange operation 1906. The Issue Bill of Exchange operation 1906 is included in a Bill of Exchange Receivable Issuing Output Out interface 1908. The Issue Bill of Exchange operation 1906 requests the issuing of a bill of exchange. The Issue Bill of Exchange operation 1906 sends a Form Bill Of Exchange Receivable Issue Request message 1910 that is received by the Payment Processing at Business Partner process component 138.

Interactions between Process Components "Due Item Processing" and "Due Item Processing at Business Partner"

Figure 20:
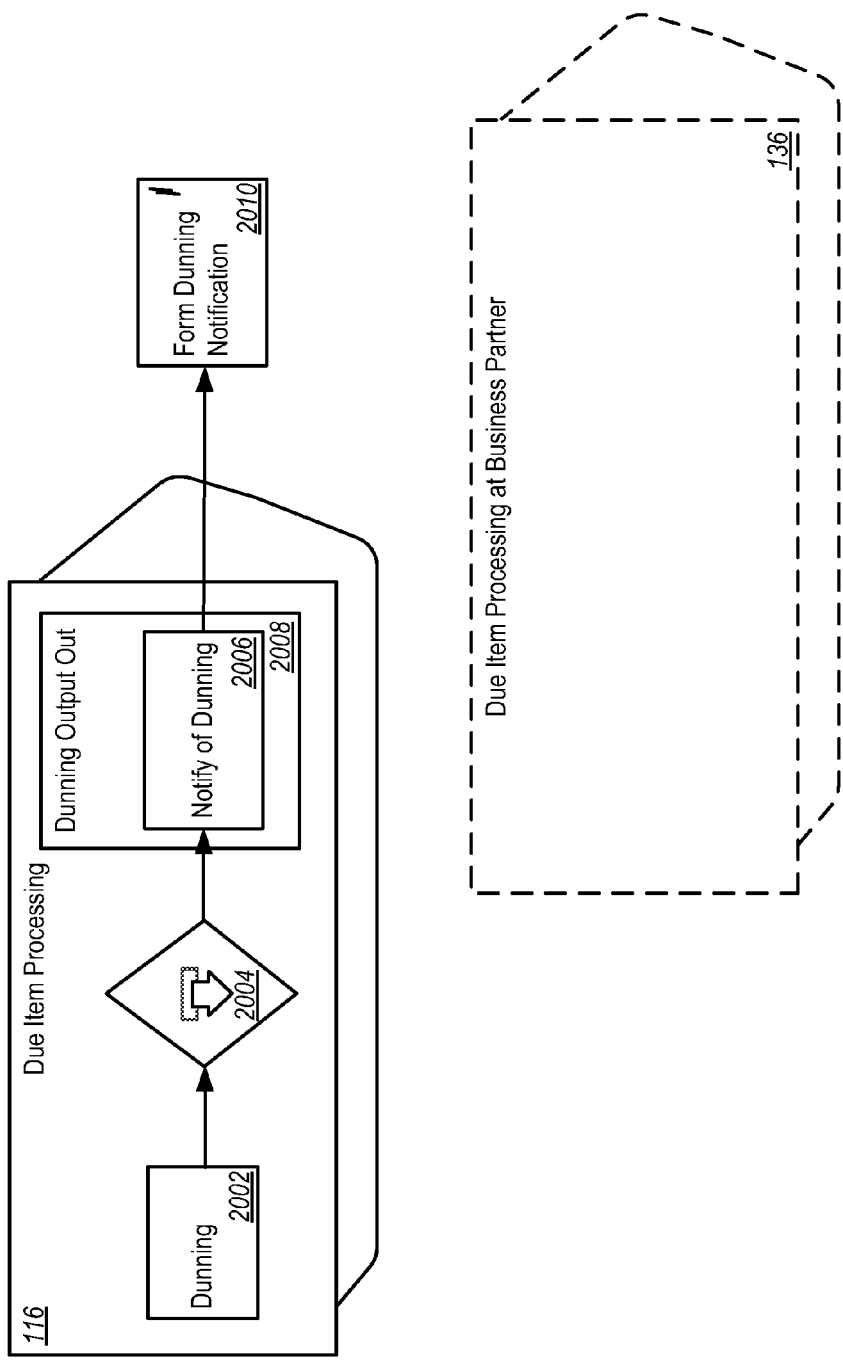
FIG. 20 is a block diagram showing interactions between the Due Item Processing process component and a Due Item Processing at Business Partner process component.

FIG. 20 is a block diagram showing interactions between the Due Item Processing process component 116 and the Due Item Processing at Business Partner process component 136 in the architectural design of FIG. 1. The interaction starts when a dunning is released. The Due Item Processing process component 116 notifies a business partner about outstanding receivables and expected payments.

As shown in FIG. 20, the Due Item Processing process component 116 includes the Dunning business object 2002. The Dunning business object 2002 represents a reminder or demand from a company (e.g. a creditor) to a business partner (e.g. a debtor) to make a payment by a certain point in time. The business object 2002 uses a Notify of Dunning to Business Partner outbound process agent 2004 to invoke a Notify of Dunning operation 2006. The Notify of Dunning operation 2006 is included in a Dunning Output Out interface 2008. The Notify of Dunning operation 2006 notifies the business partner about outstanding payments. The Notify of Dunning operation 2006 sends a Form Dunning Notification message 2010 to the Due Item Processing at Business Partner process component 136.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the software architecture design or of what may be claimed, but rather as an exemplification of preferred embodiments of the software architecture design. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer program product comprising instructions encoded on a non-transitory, computer-readable medium, the instructions being structured as process components interacting with each other through service interfaces, the instructions operable when executed by at least one processor to:
define a plurality of process components, each of the process components comprising a modular and application-independent package of reusable, granular software implementing a respective and distinct business process, the business process comprising functionality exposed by the process component via a corresponding service interface, the plurality of process components including:
an accounting process component that handles the representation of relevant business transactions for valuation and profitability analysis;
a financial accounting master data management process component that handles the management of financial accounting master data that is used both for accounting and costing purposes;
a balance of foreign payment management process component that handles the collection, processing, and reporting of receivables and payables according to foreign trade regulations that are used by the financial authority of a country;
a due item processing process component that handles the collection, management, and monitoring of trade receivables or payables and corresponding sales tax or withholding tax;
a customer quote processing process component that handles the processing of quotes to customers offering the delivery of goods according to specific terms;
a sales order processing process component that handles the processing of customers' requests to a seller for the delivery of goods, on a specific date, for a specific quantity, and for a specific price;
a service confirmation processing process component that handles the reporting back of actual times and quantities for services provided, and spare parts consumed related to the execution of a service order; and
a payment processing process component that handles the processing and management of payments, and is responsible for the associated communication with financial institutions; and
define a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based pair-wise interaction between the respective process components of the respective operations, the pair-wise interactions between pairs of the process components including interactions between:
the sales order processing process component and the financial accounting master data management process component, where the pair-wise interaction between the sales order processing process component and the financial accounting master data management process component includes the transmission of:
a product and resource valuation query message from the sales order processing process component to the financial accounting master data management process component, the product and resource valuation query message comprising a request for a product valuation, the product valuation associated with a valuation of one or more products or resources with internal valuation prices or internal cost rates; and
a product and resource valuation response message from the financial accounting master data management process component to the sales order processing process component, the product and resource valuation response message comprising a response to the product valuation request;
the service confirmation processing process component and the accounting process component, where the pair-wise interaction between the service confirmation processing process component and the accounting process component includes the transmission of:
a sales and purchasing accounting notification message from the service confirmation processing process component to the accounting process component, the sales and purchasing accounting notification message comprising a notification to accounting about the creation, change, or deletion of a service confirmation;
the sales order processing process component and the due item processing process component, where the pair-wise interaction between the sales order processing process component and the due item processing process component includes the transmission of:
- a request creditworthiness query message from the sales order processing process component to the due item processing process component, the request creditworthiness query message comprising a request to determine whether a particular sales order is covered by a current credit limit of a customer; and
- a request creditworthiness response message from the due item processing process component to the sales order processing process component, the request creditworthiness response message comprising a response to the request creditworthiness query message and providing an update about the creditworthiness of the customer;

the customer quote processing process component and the due item processing process component, where the pair-wise interaction between the customer quote processing process component and the due item processing process component includes the transmission of:
- a credit worthiness query message from the customer quote processing process component to the due item processing process component, the credit worthiness query message comprising a request to verify the data or value of a current document against an actual credit standing of a customer; and
- a credit worthiness response message from the due item processing process component to the customer quote processing process component, the credit worthiness response message comprising a response to the credit worthiness query message and providing an update regarding the creditworthiness of the customer;

the sales order processing process component and the accounting process component, where the pair-wise interaction between the sales order processing process component and the accounting process component includes the transmission of:
- a sales and purchasing accounting notification message from the sales order processing process component to the accounting process component, the sales and purchasing accounting notification message comprising a notification to accounting when a service provision, included in a sales order, is created or cancelled;

the customer quote processing process component and the financial accounting master data management process component, where the pair-wise interaction between the customer quote processing process component and the financial accounting master data management process component includes the transmission of:
- a product and resource valuation query message from the customer quote processing process component to the financial accounting master data management process component, the product and resource valuation query message comprising a request for a product valuation for one or more products or resources with internal valuation prices or internal cost rates; and
- a product and resource valuation response message from the financial accounting master data management process component to the customer quote processing process component, the product and resource valuation response message comprising a response to the product and resource valuation request; and the payment processing process component and the due item processing process component, where the pair-wise interaction between the payment processing process component and the due item processing process component includes the transmission of:
- a clearing request message from the payment processing process component to the due item processing process component, the clearing request message comprising a request to clear payments within the due item processing process component based on a created payment allocation;
- a clearing cancellation request message from the payment processing process component to the due item processing process component, the clearing cancellation request message comprising a request to cancel a previously sent clearing request by reference based on a cancelled payment allocation; and
- a clearing confirmation message from the due item processing process component to the payment processing process component, the clearing confirmation message comprising a confirmation to the payment processing process component for a clearing request; and store the defined process components and service interfaces in memory.

2. The product of claim 1, wherein:
the plurality of process components further includes:
- a customer invoice processing process component that handles the invoicing of customers for the delivery of goods or the provision of services;
- an expense and reimbursement management process component that handles the management and monitoring of expenses incurred by employees, and the reimbursement of such expenses to employees; and the pair-wise interactions between pairs of the process components further include interactions between:
- a payment processing at business partner process component and the payment processing process component;
- a bank statement creation at bank process component and the payment processing process component;
- the payment processing process component and a payment order processing at house bank process component;
- the due item processing process component and a due item processing at business partner process component;
- the sales order processing process component and the customer invoice processing process component;
- the service confirmation processing process component and the customer invoice processing process component;
- the customer invoice processing process component and the balance of foreign payment management process component; and
- the customer invoice processing process component and the accounting process component.

3. The product of claim 1, wherein:
each of the plurality of process components is assigned to exactly one deployment unit among multiple deployment units, and each deployment unit is deployable on a separate computer hardware platform independent of every other deployment unit; and all interaction between a process component in one deployment unit and any other process component in any other deployment unit takes place through the respective service interfaces of the two process components.

4. The product of claim 3, wherein the deployment units comprise:
a financials deployment unit that includes the accounting process component, the financial accounting master data management process component, the balance of foreign payment management process component, the due item processing process component, and the payment processing process component;
an expense and reimbursement deployment unit that includes the expense and reimbursement management process component;
a customer relationship management deployment unit that includes the customer quote processing process component, the sales order processing process component, and the service confirmation processing process component; and
a customer invoicing deployment unit that includes the customer invoice processing process component.

5. The product of claim 1, wherein:
each of the process components includes one or more business objects; and
none of the business objects of any one of the process components interacts directly with any of the business objects included in any of the other process components.

6. The product of claim 5, wherein the business objects comprise a business process object.

7. The product of claim 5, wherein none of the business objects included in any one of the process components is included in any of the other process components.

8. The product of claim 1, further comprising a plurality of process agents, each process agent being either an inbound process agent or an outbound process agent, each inbound process agent being operable to receive a message from a corresponding inbound operation, each outbound process agent being operable to cause a corresponding outbound operation to send a message, each process agent being associated with exactly one process component.

9. The product of claim 8, wherein each inbound process agent comprises a first inbound process agent operable to start an execution of a business process step requested in a first inbound message by creating or updating at least one business object instance.

10. The product of claim 8, wherein the outbound process agents comprise a first asynchronous outbound process agent that is called after a business object that is associated with the first outbound process agent changes.

11. The product of claim 1, wherein the operations comprise synchronous and asynchronous operations.

12. A system, comprising:
a computer system comprising at least one hardware platform for executing computer instructions, the computer instructions structured as a plurality of process components interacting with each other through service interfaces, each hardware platform including at least one processor for executing the computer instructions;
at least one memory storing a plurality of process components executable by the respective processor of the particular hardware platform, each of the process components comprising a modular and application-independent package of reusable granular software implementing a respective and distinct business process, the business process comprising functionality exposed by the process component via at least one service interface, the plurality of process components including:
an accounting process component that handles the representation of relevant business transactions for valuation and profitability analysis;
a financial accounting master data management process component that handles the management of financial accounting master data that is used both for accounting and costing purposes;
a balance of foreign payment management process component that handles the collection, processing, and reporting of receivables and payables according to foreign trade regulations that are used by the financial authority of a country;
a due item processing process component that handles the collection, management, and monitoring of trade receivables or payables and corresponding sales tax or withholding tax;
a customer quote processing process component that handles the processing of quotes to customers offering the delivery of goods according to specific terms;
a sales order processing process component that handles the processing of customers' requests to a seller for the delivery of goods, on a specific date, for a specific quantity, and for a specific price;
a service confirmation processing process component that handles the reporting back of actual times and quantities for services provided, and spare parts consumed related to the execution of a service order; and
a payment processing process component that handles the processing and management of payments, and is responsible for the associated communication with financial institutions; and
the memory further storing a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based pair-wise interaction between the respective process components of the respective operations, the pair-wise interactions between pairs of the process components including interactions between:
the sales order processing process component and the financial accounting master data management process component, where the pair-wise interaction between the sales order processing process component and the financial accounting master data management process component includes the transmission of:
a product and resource valuation query message from the sales order processing process component to the financial accounting master data management process component, the product and resource valuation query message comprising a request for a product valuation, the product valuation associated with a valuation of one or more products or resources with internal valuation prices or internal cost rates; and
a product and resource valuation response message from the financial accounting master data management process component to the sales order processing process component, the product and resource valuation response message comprising a response to the product valuation request;

the service confirmation processing process component and the accounting process component, where the pair-wise interaction between the service confirmation processing process component and the accounting process component includes the transmission of:
  a sales and purchasing accounting notification message from the service confirmation processing process component to the accounting process component, the sales and purchasing accounting notification message comprising a notification to accounting about the creation, change, or deletion of a service confirmation;

the sales order processing process component and the due item processing process component, where the pair-wise interaction between the sales order processing process component and the due item processing process component includes the transmission of:
  a request creditworthiness query message from the sales order processing process component to the due item processing process component, the request creditworthiness query message comprising a request to determine whether a particular sales order is covered by a current credit limit of a customer; and
  a request creditworthiness response message from the due item processing process component to the sales order processing process component, the request creditworthiness response message comprising a response to the request creditworthiness query message and providing an update about the creditworthiness of the customer;

the customer quote processing process component and the due item processing process component, where the pair-wise interaction between the customer quote processing process component and the due item processing process component includes the transmission of:
  a credit worthiness query message from the customer quote processing process component to the due item processing process component, the credit worthiness query message comprising a request to verify the data or value of a current document against an actual credit standing of a customer; and
  a credit worthiness response message from the due item processing process component to the customer quote processing process component, the credit worthiness response message comprising a response to the credit worthiness query message and providing an update regarding the creditworthiness of the customer;

the sales order processing process component and the accounting process component, where the pair-wise interaction between the sales order processing process component and the accounting process component includes the transmission of:
  a sales and purchasing accounting notification message from the sales order processing process component to the accounting process component, the sales and purchasing accounting notification message comprising a notification to accounting when a service provision, included in a sales order, is created or cancelled;

the customer quote processing process component and the financial accounting master data management process component, where the pair-wise interaction between the customer quote processing process component and the financial accounting master data management process component includes the transmission of:
  a product and resource valuation query message from the customer quote processing process component to the financial accounting master data management process component, the product and resource valuation query message comprising a request for a product valuation for one or more products or resources with internal valuation prices or internal cost rates; and
  a product and resource valuation response message from the financial accounting master data management process component to the customer quote processing process component, the product and resource valuation response message comprising a response to the product and resource valuation request; and the payment processing process component and the due item processing process component, where the pair-wise interaction between the payment processing process component and the due item processing process component includes the transmission of:
  a clearing request message from the payment processing process component to the due item processing process component, the clearing request message comprising a request to clear payments within the due item processing process component based on a created payment allocation;
  a clearing cancellation request message from the payment processing process component to the due item processing process component, the clearing cancellation request message comprising a request to cancel a previously sent clearing request by reference based on a cancelled payment allocation; and
  a clearing confirmation message from the due item processing process component to the payment processing process component, the clearing confirmation message comprising a confirmation to the payment processing process component for a clearing request.

13. The system of claim 12, wherein:
the plurality of process components further includes:
  a customer invoice processing process component that handles the invoicing of customers for the delivery of goods or the provision of services;
  an expense and reimbursement management process component that handles the management and monitoring of expenses incurred by employees, and the reimbursement of such expenses to employees; and
the pair-wise interactions between pairs of the process components include interactions between:
  a payment processing at business partner process component and the payment processing process component;
  a bank statement creation at bank process component and the payment processing process component;
  the payment processing process component and a payment order processing at house bank process component;
  the due item processing process component and a due item processing at business partner process component;

the sales order processing process component and the customer invoice processing process component;
the service confirmation processing process component and the customer invoice processing process component;
the customer invoice processing process component and the balance of foreign payment management process component; and
the customer invoice processing process component and the accounting process component.

14. The system of claim 12, wherein:
each of the process components includes one or more business objects; and
none of the business objects of any one of the process components interacts directly with any of the business objects included in any of the other process components.

15. The system of claim 12, wherein none of the business objects included in any one of the process components is included in any of the other process components.

16. The system of claim 12, wherein a plurality of process agents, each process agent being either an inbound process agent or an outbound process agent, each inbound process agent being operable to receive a message from a corresponding inbound operation, each outbound process agent being operable to cause a corresponding outbound operation to send a message, each process agent being associated with exactly one process component.

17. The system of claim 12, the system comprising multiple hardware platforms, wherein:
the accounting process component, the financial accounting master data management process component, the balance of foreign payment management process component, the due item processing process component, and the payment processing process component are deployed on a first hardware platform;
the expense and reimbursement management process component is deployed on a second hardware platform;
the customer quote processing process component, the sales order processing process component, and the service confirmation processing process component are deployed on a third hardware platform; and
the customer invoice processing process component is deployed on a fifth hardware platform.

18. The system of claim 17, wherein each of the first through the fifth hardware platforms are distinct and separate from each other.

19. A method for developing a computer software application, comprising:
obtaining, in a programmable computer system having at least one processor, a storage medium, and an interface, digital data representing an architectural design for a set of processes implementing an end-to-end application process, the design specifying a process component for each process in the set of processes, each of the process components comprising a modular and application-independent package of reusable granular software implementing a respective and distinct business process, the business process comprising functionality exposed by the process component, and the design further specifying a set of process component interactions based on messages transmitted between two or more of the process components, wherein:
the specified process components include:
an accounting process component that handles the representation of relevant business transactions for valuation and profitability analysis;
a financial accounting master data management process component that handles the management of financial accounting master data that is used both for accounting and costing purposes;
a balance of foreign payment management process component that handles the collection, processing, and reporting of receivables and payables according to foreign trade regulations that are used by the financial authority of a country;
a due item processing process component that handles the collection, management, and monitoring of trade receivables or payables and corresponding sales tax or withholding tax;
a customer quote processing process component that handles the processing of quotes to customers offering the delivery of goods according to specific terms;
a sales order processing process component that handles the processing of customers' requests to a seller for the delivery of goods, on a specific date, for a specific quantity, and for a specific price;
a service confirmation processing process component that handles the reporting back of actual times and quantities for services provided, and spare parts consumed related to the execution of a service order; and
a payment processing process component that handles the processing and management of payments, and is responsible for the associated communication with financial institutions; and
the process component interactions include interactions between:
the sales order processing process component and the financial accounting master data management process component, where the pair-wise interaction between the sales order processing process component and the financial accounting master data management process component includes the transmission of:
a product and resource valuation query message from the sales order processing process component to the financial accounting master data management process component, the product and resource valuation query message comprising a request for a product valuation, the product valuation associated with a valuation of one or more products or resources with internal valuation prices or internal cost rates; and
a product and resource valuation response message from the financial accounting master data management process component to the sales order processing process component, the product and resource valuation response message comprising a response to the product valuation request;
the service confirmation processing process component and the accounting process component, where the pair-wise interaction between the service confirmation processing process component and the accounting process component includes the transmission of:
a sales and purchasing accounting notification message from the service confirmation processing process component to the accounting process component, the sales and purchasing accounting notification message comprising a notification to accounting about the creation, change, or deletion of a service confirmation;

the sales order processing process component and the due item processing process component, where the pair-wise interaction between the sales order processing process component and the due item processing process component includes the transmission of:
- a request creditworthiness query message from the sales order processing process component to the due item processing process component, the request creditworthiness query message comprising a request to determine whether a particular sales order is covered by a current credit limit of a customer; and
- a request creditworthiness response message from the due item processing process component to the sales order processing process component, the request creditworthiness response message comprising a response to the request creditworthiness query message and providing an update about the creditworthiness of the customer;

the customer quote processing process component and the due item processing process component, where the pair-wise interaction between the customer quote processing process component and the due item processing process component includes the transmission of:
- a credit worthiness query message from the customer quote processing process component to the due item processing process component, the credit worthiness query message comprising a request to verify the data or value of a current document against an actual credit standing of a customer; and
- a credit worthiness response message from the due item processing process component to the customer quote processing process component, the credit worthiness response message comprising a response to the credit worthiness query message and providing an update regarding the creditworthiness of the customer;

the sales order processing process component and the accounting process component, where the pair-wise interaction between the sales order processing process component and the accounting process component includes the transmission of:
- a sales and purchasing accounting notification message from the sales order processing process component to the accounting process component, the sales and purchasing accounting notification message comprising a notification to accounting when a service provision, included in a sales order, is created or cancelled;

the customer quote processing process component and the financial accounting master data management process component, where the pair-wise interaction between the customer quote processing process component and the financial accounting master data management process component includes the transmission of:
- a product and resource valuation query message from the customer quote processing process component to the financial accounting master data management process component, the product and resource valuation query message comprising a request for a product valuation for one or more products or resources with internal valuation prices or internal cost rates; and
- a product and resource valuation response message from the financial accounting master data management process component to the customer quote processing process component, the product and resource valuation response message comprising a response to the product and resource valuation request; and the payment processing process component and the due item processing process component, where the pair-wise interaction between the payment processing process component and the due item processing process component includes the transmission of:
- a clearing request message from the payment processing process component to the due item processing process component, the clearing request message comprising a request to clear payments within the due item processing process component based on a created payment allocation;
- a clearing cancellation request message from the payment processing process component to the due item processing process component, the clearing cancellation request message comprising a request to cancel a previously sent clearing request by reference based on a cancelled payment allocation; and
- a clearing confirmation message from the due item processing process component to the payment processing process component, the clearing confirmation message comprising a confirmation to the payment processing process component for a clearing request; and generating, using the at least one processor on the computer system, a computer software application to perform the set of processes based on the obtained design including the specified process components and the specified process component interactions.

20. The method of claim 19, wherein:
the specified process components further include:
- a customer invoice processing process component that handles the invoicing of customers for the delivery of goods or the provision of services;
- an expense and reimbursement management process component that handles the management and monitoring of expenses incurred by employees, and the reimbursement of such expenses to employees; and the process component interactions further include interactions between:
- a payment processing at business partner process component and the payment processing process component;
- a bank statement creation at bank process component and the payment processing process component;
- the payment processing process component and a payment order processing at house bank process component;
- the due item processing process component and a due item processing at business partner process component;
- the sales order processing process component and the customer invoice processing process component;
- the service confirmation processing process component and the customer invoice processing process component;
- the customer invoice processing process component and the balance of foreign payment management process component; and
- the customer invoice processing process component and the accounting process component.

21. The method of claim 19, wherein each process in the set of processes is a business process transforming a defined business input into a defined business outcome.

22. The method of claim 21, wherein obtaining digital data representing the architectural design further comprises editing the design before using the design.

* * * * *